(12) United States Patent
Kristal et al.

(10) Patent No.: US 10,740,941 B2
(45) Date of Patent: *Aug. 11, 2020

(54) PROCESSING USER SELECTABLE PRODUCT IMAGES AND FACILITATING VISUALIZATION-ASSISTED VIRTUAL DRESSING

(71) Applicant: Zeekit Online Shopping Ltd., Tel Aviv (IL)

(72) Inventors: Alon Kristal, Tel Aviv (IL); Nir Appleboim, Tel Aviv (IL); Yael Wiesel, Ramat Gan (IL); Israel Harry Zimmerman, Los Angeles, CA (US)

(73) Assignee: Zeekit Online Shopping Ltd, Tel Aviv (IL)

(*) Notice: Subject to any disclaimer, the term of this patent is extended or adjusted under 35 U.S.C. 154(b) by 0 days.

This patent is subject to a terminal disclaimer.

(21) Appl. No.: 16/657,121

(22) Filed: Oct. 18, 2019

(65) Prior Publication Data
US 2020/0118318 A1 Apr. 16, 2020

Related U.S. Application Data

(63) Continuation of application No. 16/279,558, filed on Feb. 19, 2019, now Pat. No. 10,489,955, which is a (Continued)

(51) Int. Cl.
*G06T 11/60* (2006.01)
*G06Q 30/06* (2012.01)
(Continued)

(52) U.S. Cl.
CPC .......... *G06T 11/60* (2013.01); *G06Q 30/0643* (2013.01); *G06F 3/0482* (2013.01); *G06T 3/40* (2013.01); *G06T 2200/24* (2013.01)

(58) Field of Classification Search
None
See application file for complete search history.

(56) References Cited

U.S. PATENT DOCUMENTS 5,960,411 A 9/1999 Hartman et al.
6,307,568 B1* 10/2001 Rom .................. G06T 19/00
345/629
(Continued)

OTHER PUBLICATIONS

Wikipedia, "Polyvore" Feb. 2007, 4 pages.
(Continued)

*Primary Examiner* — YuJang Tswei
(74) *Attorney, Agent, or Firm* — Walter W. Duft

(57) ABSTRACT

A technique for combining first and second images respectively depicting first and second subject matter to facilitate virtual presentation. A first image depicting the first subject matter may be received digital form. A second image depicting the second subject matter may also be received digital form. The second image may be image-processed in various ways to prepare the second subject matter for virtual presentation with the first subject matter. A composite image may be generated that depicts the second subject matter overlayed onto the first subject matter. The composite image may be caused to be displayed in a virtual presentation.

24 Claims, 29 Drawing Sheets

Related U.S. Application Data continuation of application No. 15/263,034, filed on Sep. 12, 2016, now Pat. No. 10,290,136.

(60) Provisional application No. 62/372,813, filed on Aug. 10, 2016.

(51) Int. Cl.
*G06T 3/40* (2006.01)
*G06F 3/0482* (2013.01)

(56) References Cited

U.S. PATENT DOCUMENTS

| | | | |
|---|---|---|---|
| 6,556,222 | B1 | 4/2003 | Narayanaswami |
| 9,470,911 | B2 | 10/2016 | Fonte |
| 10,290,136 | B2 * | 5/2019 | Kristal ............... G06Q 30/0643 |
| 2002/0126132 | A1 | 9/2002 | Karatassos et al. |
| 2009/0002397 | A1 | 1/2009 | Forlines |
| 2009/0300676 | A1 | 12/2009 | Harter, Jr. |
| 2010/0111370 | A1 | 5/2010 | Black et al. |
| 2011/0078055 | A1 * | 3/2011 | Faribault ............... G06Q 30/02 705/27.2 |
| 2012/0306918 | A1 * | 12/2012 | Suzuki ............... G06F 3/04845 345/633 |
| 2013/0215116 | A1 | 8/2013 | Siddique |
| 2014/0176565 | A1 | 6/2014 | Adeyoola |
| 2014/0188670 | A1 | 7/2014 | Ajala |
| 2014/0226900 | A1 | 8/2014 | Saban et al. |
| 2014/0314313 | A1 | 10/2014 | Kennedy |

OTHER PUBLICATIONS

R. McKinsey, "Israeli start-ups make online shopping easier", The Times of Israel, <http://www.timesofisrael.com/shoes-style-and-startups/>, Feb. 18, 2014, 4 pages.

R. Goldenberg, "The Google of Fashion", Globes Israel'S Business Arena, <http://www.globes.co.il/en/article-the-google-of-fashion-1000951381>, Jul. 3, 2014, 4 pages.

J. Wolf, "Meet the Top Ten Israeli Companies Revolutionizing Fashion Tech", Nocamels Israeli Innovation News, <http://nocamels.com/2015/02/israel-fashion-tech/>, Feb. 2015, 34 pages.

D. Pajevic, How to Blend an Image into a Background Using Photoshop _ Creating a Webstore, Mar. 30, 2016, <http://www.creatingawebstore.com>, 12 pages.

L. Rogge et al., "Garment Replacement in Monocular Video Sequences", 2014, ACM (Year: 2014), 10 pages.

Zeekit Online Shopping Ltd, "List of Patents or Patent Applications Treated as Related", Oct. 18, 2019, 1 page.

PCT International Searching Authority, "Notification of Transmittal of International Search Report and the Written Opinion of the International Searching Authority, or the Declaration", PCT/IL2017/050829 of Zeekit Online Shopping, Ltd, dated Dec. 7, 2017, 12 pages.

* cited by examiner

Fig. 1: System

Fig. 3: Product Handler

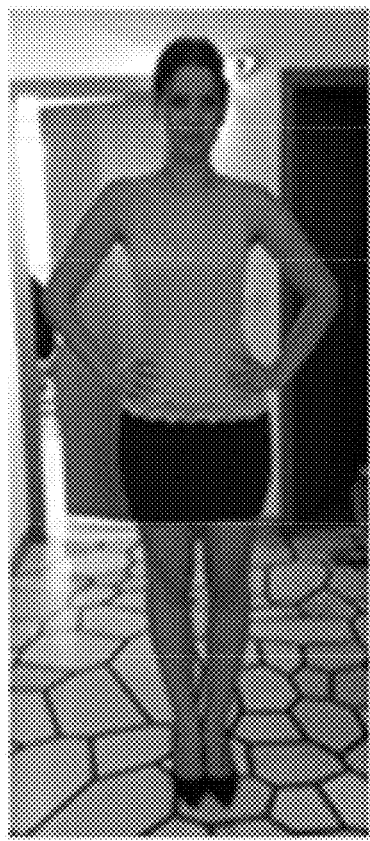 
Fig. 7                    Fig. 8

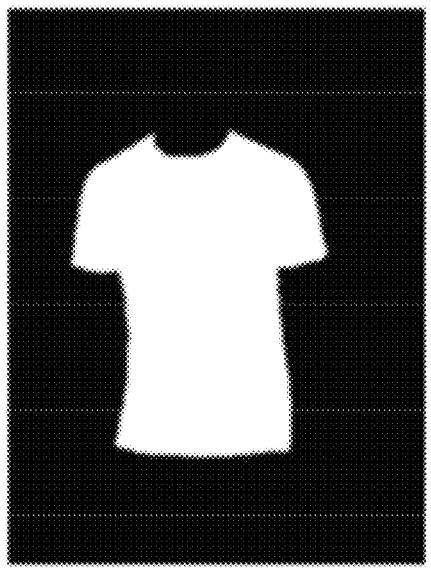 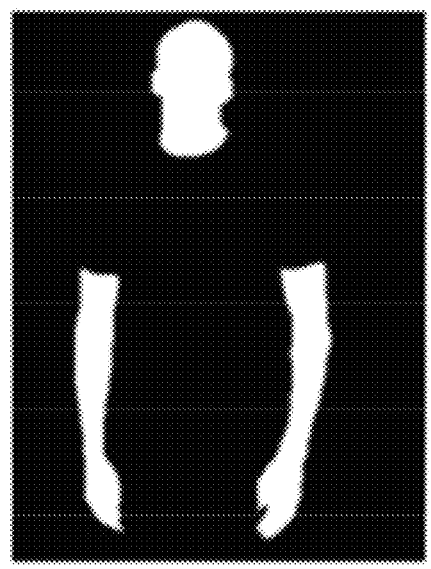
Fig. 13                    Fig. 14

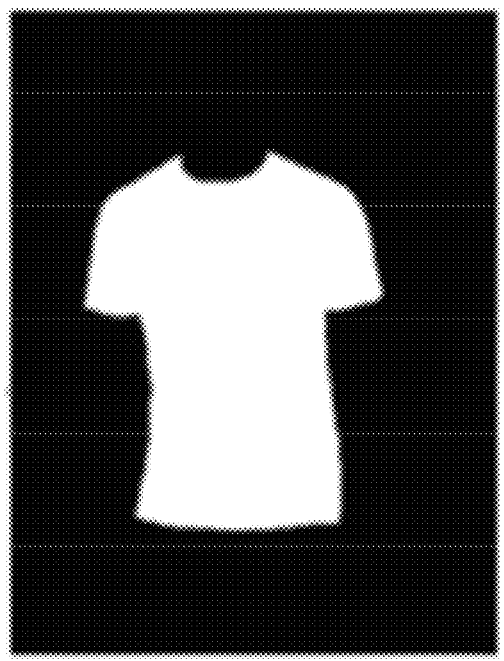
Fig. 24  Fig. 25

| Size | Bust | Waist | Hip |
|---|---|---|---|
| 2 | 24 | 21 | 25 |
| 4 | 25 | 22 | 26 |
| 6 | 26 | 23 | 27 |
| 8 | 27 | 24 | 28 |
| 10 | 28 | 25 | 29 |
| 12 | 29 | 26 | 30 |
| 14 | 30 | 27 | 31 |
| 16 | 31 | 28 | 32 |
| 18 | 32 | 29 | 33 |
| 20 | 33 | 30 | 34 |

PROCESSING USER SELECTABLE PRODUCT IMAGES AND FACILITATING VISUALIZATION-ASSISTED VIRTUAL DRESSING

BACKGROUND

1. Field

The present disclosure is related to image processing.

2. Description of the Prior Art

By way of background, when a product is offered for sale at a retail shopping venue, the product may be put on display to depict how it will appear when used for its intended purpose, thereby allowing visualization-assisted product transactions, such as product acquisition. This is particularly the case when the product is for use in combination with other products. As one example, a clothing retailer may place a mannequin in a store front window to display an outfit consisting of items that can be worn together. This allows potential customers to readily visualize how that particular set of clothing items will look when worn in combination as an outfit. Customers may then try on the same outfit to see how it looks on them. Or they may mix and match clothing items to create different outfits that they can try on before making a purchase decision.

Visualization-assisted product transactions are more challenging when physical goods are not on hand, and only images are available, such as at Internet websites. For example, clothing vendor websites may display images of clothing separately from one another, or arranged in random combinations, making it difficult to visualize how the items will look when actually worn. Some clothing vendor websites do present images of human models wearing outfits. However, these images are fixed. As far as known, there is no ability for customers to dynamically create properly-proportioned images with customer-selected clothing combinations. Nor is there any ability to dynamically create images that allow the customers to visualize themselves wearing different combinations of clothing items.

To purchase products on Internet websites, a "shopping cart" paradigm is typically used. As an online shopper views products on a website they may select items for purchase using a virtual shopping cart that metaphorically holds the products until the shopper is ready to complete the purchase using a "checkout" procedure. An alternative to the shopping cart paradigm is the "one-click" paradigm whereby a shopper purchases an item using a single mouse-click operation. As far as known, the one-click paradigm only allows one item to be purchased per mouse-click. It does not allow multiple items to be purchased with one mouse click.

Millions of users utilize desktop computers, laptop computers, smartphones, tablets, and other electronic devices on a daily basis, for personal and professional goals. Many such electronic devices contain a camera, allowing the user to capture images, audio, and audio-video clips. Electronic devices are further used for a variety of purposes, for example, to browse the Internet, to play games, to perform word processing tasks, to engage in video conferencing, for Instant Messaging (IM) and online chat, and/or other suitable purposes.

SUMMARY

A data processing method, system and computer program product are provided for processing user selectable images and facilitating visualization-assisted virtual presentation. In an embodiment, a first image depicting first subject matter may be received in digital form. A second image depicting second subject matter may also be received in digital form. One or more image processing operations may be performed on the second image. The one or more image processing operations may be selected from the group consisting of:

(1) shape-estimation and shape in-painting, said shape-estimation comprising interpolating shape for hidden areas of the second subject matte that are not visible in the second image, and the shape in-painting comprising filling in the hidden areas of the second subject matter in the second image that were interpolated by the shape-estimation;

(2) perspective and shape correction, the perspective and shape correction comprising one or both of (a) adding, reducing, creating or modifying wrinkle effects in the second image, or (b) adding 3D effects in the second image by modifying an angular perspective and shape to change non-curved contour lines to curved contour lines in the second image;

(3) features and classification processing, the features and classification processing comprising extracting second subject matter characteristics and points-of-interest from the second image and classifying the second subject matter based on the second subject matter characteristics and points-of-interest;

(4) second subject matter extraction, the second subject matter extraction comprising generating a second subject matter mask in which one or more portions of the second image are removed, added, completed or modified;

(5) adding gravity effects, the adding gravity effects comprising simulating an effect of gravity on one or more portions of the second subject matter by modifying the second image so that the one or more portions of the second subject matter appear to be dropping down due to gravity; and (6) unifying a blur level, lighting level and noise level of the first image and the second image.

A composite image may be generated that depicts the second subject matter overlayed onto the first subject matter. The composite image may be caused to be displayed.

The disclosed subject matter may provide other and/or additional benefits or advantages.

BRIEF DESCRIPTION OF THE DRAWINGS

The foregoing and other features and advantages will be apparent from the following more particular description of example embodiments, as illustrated in the accompanying Drawings.

FIG. 7 is a user image illustrating certain image processing that may be performed in accordance with the present disclosure.

FIG. 8 is a user image illustrating certain image processing that may be performed in accordance with the present disclosure.

FIG. 13 is a product mask resulting from certain image processing that may be performed in accordance with the present disclosure.

FIG. 14 is a user mask resulting from certain image processing that may be performed in accordance with the present disclosure.

FIG. 24 is a product image obtained from a product image source.

FIG. 25 is a product mask corresponding to the product image of FIG. 24 resulting from certain image processing that may be performed in accordance with the present disclosure.

DETAILED DESCRIPTION OF EXAMPLE EMBODIMENTS

Figure 1:
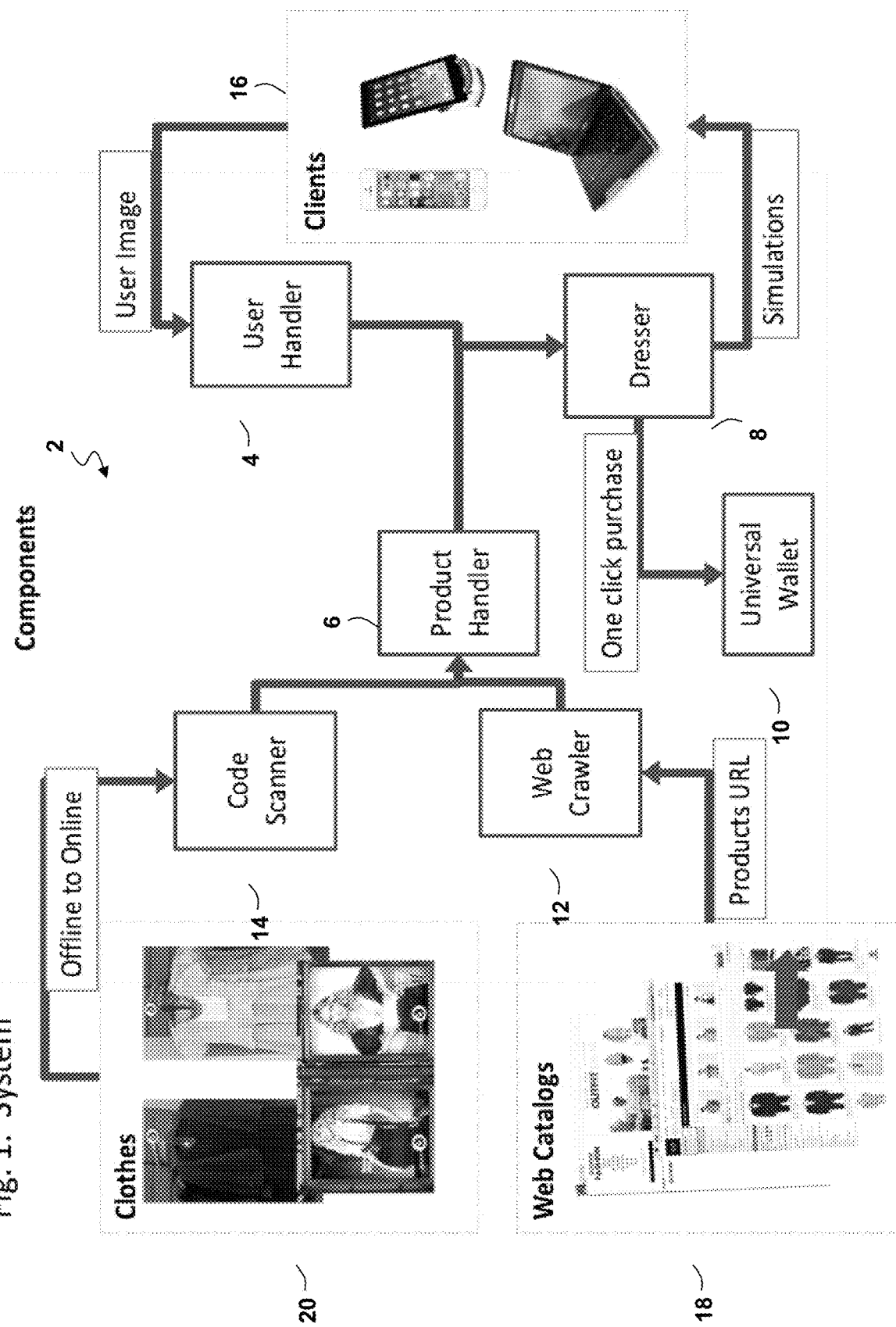
FIG. 1 is a block diagram showing an example system that may be implemented in accordance with the present disclosure.

For demonstrative purposes, some portions of the discussion herein and/or some portions of the drawings, may relate to "clothes" or to a "product", which may be virtually dressed or may be put-on an image or a user. This is only a non-limiting example; and terms such as "clothes" or "product" may comprise various types of items, for example, shirt, pants, dresses, skirts, shoes, and various other articles of clothing; accessory items or jewelry items or decorative items (e.g., necklace, bracelet, earrings, sunglasses, watch, reading glasses, piercing items, purse, bag, handbag, or the like), and/or other products or items that a person need not necessarily "wear" but that a person may wish to view how such item or product would look in proximity to that person (e.g., a decorative suitcase that a person considers to purchase, and would like to visualize how that particular suitcase would look when placed in proximity to himself). Accordingly, the terms "product" or "clothes" may comprise all such items; and/or may comprise a plurality or combination or assembly of such items, for example, a shirt and pants, a shirt and handbag, a skirt and shoes, sunglasses and necklace, or the like.

In an embodiment, an anchor image is generated that serves as "canvas" to which one or more product images may be added. The anchor image may depict an anthropomorphic entity. For example, a user may capture a single image (or multiple images, or a video clip) of the user by way of a user application or device; such as by taking a "selfie" image of himself, or by photographing herself standing in front of a mirror, or by asking a friend to take a photo of the user. A local or remote application (e.g., client side, server side, native application or "app," mobile application, web-site, web-page, or the like) may utilize the image of the user, and may process or analyze the image of the user, in order to automatically improve it or prepare it for virtual dressing.

Optionally, the user may manually enter his gender, and/or his height, and/or other optional user parameters (e.g., weight; shirt size; pants size; or the like). These optional parameters may further be utilized for enhancing or preparing the user depicted in the anchor image for virtual dressing of clothes or other products. Optionally, such data or parameters may be determined autonomously, based on one or more other data, for example, based on the user's name (e.g., "Adam" indicating a male; "Eve" indicating a female), based on the user's appearance (e.g., identifying anatomical structure or features that are typical of a male, or a female), or by utilizing other objects to infer user height (e.g., if the photo also shows a standard-size item, such as an electrical socket on a wall, or a banana or an orange located on a shelf behind the user, or a published book whose dimensions may be obtained from an online source, or a smartphone or tablet whose dimensions may be known or estimated). Optionally, user height may be estimated by the system, based on a ratio between head-size and body-size of the user; or based on a ratio between head-size and size of other body organ or body part (e.g., arm, leg).

Optionally, the anchor image may depict an anthropomorphic entity that is not a user. Examples include, but are not limited to, an image of a real or virtual human model figure, an image of a mannequin or other non-human model figure, an avatar image, etc. As a further option, it is possible to entirely dispense with an anthropomorphic entity in the anchor image and instead use an anchor image having no such entity depicted. In some cases, the anchor image may be a blank image, or may include a background image. One example of a blank anchor image is one that is merely a transparent grid having hidden axes that provide the anchor image scale. Another example of a blank anchor image is one that has a single color (e.g., white). For anchor images that include a background image, there may also be a foreground image of an anthropomorphic entity, such as a human user image received from a user application or device. In that case, the background image and/or the anthropomorphic entity image (e.g., human image) may be scaled to match each other. For example, if the anchor image depicts a mountain in the background an a human in the foreground, the human may be depicted in correct proportion to the mountain.

In an embodiment, an indication of a product may be received, such as a clothes item, that the user would like to introduce into the anchor image for the purpose of generating a composite anchor image that includes an image of the product. For example, the user may wish to virtually dress an anthropomorphic entity depicted in the anchor image. The product indication may be provided by the user, who may select the item from any suitable source, including but not limited to selecting from an online catalog (webpage), or scanning a barcode or a QR code or a price-tag or a clothes-tag of an actual product in a store, or capturing an image of the product (e.g., from the actual product or from images thereof in print media such as a newspaper or magazine), or entering or dictating or saying the name of a product or vendor, for example, "Old Navy, skirt, model Barbara," which the may be looked-up online or at a vendor's website in order to extract therefrom the items' data and image. Additional product sources include "inspirational" sources, such as images depicting celebrities wearing identifiable clothing items that are available for purchase for one or more vendors.

The obtained product image may be analyzed and/or processed to prepare it for incorporation into the anchor image. This processing may include scaling and positioning the product image for enhanced virtual dressing or enhanced virtual fitting onto an anthropomorphic entity or into an anchor image having no anthropomorphic entity.

In an embodiment, one or more products having one or more associated product images may be identified. The one or more product images may be image processed by incorporating the image(s) into an anchor image to generate the composite digital anchor image that depicts the products according to an intended manner of use thereof. For example, if there are two or more clothing products, such as a shirt and a pair of pants, the products may be depicted in their normal spatial relationship (i.e., with the shirt above the pants). The product images may be appropriately layered at locations where they overlap. For example, the bottom of a shirt can be made to appear to lie over the top of a pair of pants if the shirt is not tucked into the pants.

The image processing may include using product dimension information to scale the product images as necessary to match a scale of the anchor image. For example, the scale of the anchor image (e.g., in pixels per centimeter or inch) may be known. Using the dimensions of the product image, which may be maintained as dimension data in association with the product (e.g., the height or width or other dimension in centimeters or inches), the size of the product image (e.g., in pixels) may be adjusted to conform to the scale of the anchor image. The scale of the anchor image presents a constant conversion ratio all across the image between pixel-based dimensions and on-screen centimeter-based (or inches-based) dimensions. The constant conversion ratio may be obtained by dividing the height of the anchor image (or a user or other anthropomorphic entity within the anchor image) in pixels, by the height of the anchor image (or a user or other anthropomorphic entity within the anchor image) in centimeters (or inches), and this constant conversion ratio may be used to resize the product images, either by decreasing or decreasing their size (pixels). By way of example, if the scale of the anchor image is 100 pixels per centimeter, and the scale of a product image is 150 pixels per centimeter, a product having a height of 10 centimeters would span 1500 pixels in the product image but would be scaled down to 1000 pixels in the anchor image.

In some cases, a product's dimension information may not be known, but product size data that is maintained in association with the product may be available. The size data could be numeric, such as a dress size of 2, 4, 6, etc., or alphanumeric, such as a shirt or jacket size of S, M, L, XL, etc. Using known correlations between product sizes and dimensions (e.g., lookup tables), a product's dimension information may be derived from the product's size information.

In an embodiment, the product images may be retrieved from separate sources of the products, such as separate data processing agents associated with separate vendors of the products. Alternatively, the product images may be retrieved from a single source of the products, such as a single data processing agent associated with a single vendor of all the products.

If the products are clothes, accessories or other items intended to be worn or carried on or about a person, the insertion of product images into an anchor image may be referred to as virtual dressing. As noted, the initial anchor image may or may not depict an anthropomorphic entity. If it does, the composite anchor image may depict the items being worn or carried by the entity. Otherwise, if the anchor image contains no anthropomorphic entity, the items may be arranged according to their intended manner of use. For example, if the products are clothes, the virtual dressing process may be performed by spatially positioning the clothes according to the manner in which they would normally be worn, e.g., shirt above pants, pants above shoes, etc. Layering of the product images at locations where they overlap may also be depicted, such that a shirt may be depicted as covering the top of a pair of pants, the pants may be depicted as covering part of a pair of shoes, etc.

The virtual dressing process may thus include operations in which the image of an item is re-sized, enhanced, and/or modified, and then superimposed or pasted or otherwise inserted onto or into the anchor image to create a composite anchor image. Optionally, shading effects may be added or removed, either from a user portion of the composite anchor image (if present) and/or from a product portion of the composite anchor image, in order to generate a more realistic look. Optionally, gravitational effects may be added or removed, from the user's portion of the composite anchor image (if present) and/or from a product portion of the composite anchor image, such as by causing portions of the product (e.g., portions of the sleeve) to appear to be "dropping down" due to gravity, to in order to generate a more realistic look. Optionally, folding or wrinkling effects may be added or removed, from a user portion of the composite anchor image (if present) and/or from a product portion of the composite anchor image image, such as by causing particular portions of the product (e.g., stomach area of a shirt) to appear slightly wrinkled or slightly folded-in, in order to generate a more realistic look. Other suitable effects may also be used.

In some embodiments, actual resizing of the product image, in a manner that does not merely attempts to forcefully fit the product onto the image of the body of a user; but rather, in a manner that would allow the user to visualize whether a particular size of a particular product would actually fit this particular user. In a demonstrative example, a user who is 160 centimeter tall, and who typically wears a "small" size T-Shirt, may scan a barcode of an Extra Large T-Shirt. Suitable calculations may be performed to determine, that this particular shirt, if worn by this particular user, would create a visual appearance in which the lowest edge of the shirt reaches the knees of the user; and in which the short-sleeve of the shirt reaches below the user's arm. Accordingly, instead of trying to "precisely fit" the image of the shirt onto the image of the user, and instead of trying to show a perfectly-fitting shirt that is shown together with the face of the user or with an avatar or a model figure, the system of the present invention may actually generate as output, for example: an image of the actual user, showing his actual head and arms and legs, and showing thereon the pasted or superimposed image of the particular selected shirt, with the particular proportions true to life; such that the image that is shown to the user actually shows to him that if he would purchase and wear this shirt, then it would reach his knees and below his elbows.

Accordingly, instead of performing a simple resize operation, that would attempt to merely resize the chest area of the T-Shirt image to fit on the chest area of the actual user, improved re-sizing may be performed that would allow the user to see an actual image of the user emulating his or her virtual wearing of this particular shirt (or other item) having this particular item-size, even if such item does not fit this particular user (at all, or partially, or perfectly).

In an embodiment, a user may obtain an emulated or simulated image which shows the user to appear to be wearing, concurrently, two different products that optionally originate from (or are sold by) two different vendors or sources; such as, a shirt made or sold by Vendor A, and a skirt made or sold by Vendor B. Each one of the products may be separately resized and enhanced, and the two (or more) items may then be overlayed or superimposed or pasted or otherwise inserted onto or into the anchor image (which may or may not depict an anthropomorphic entity, such as the image of the user), while also keeping true-to-life dimensions or ratios, allowing an oversized item to appear oversized in the composite anchor image, or the like.

Furthermore, the user may proceed to place a purchase order for the one or more items, via a single click mechanism, or via a single checkout mechanism that includes one or more input operations, and a universal digital wallet or payment mechanism may be used in order to enable the user to perform a single checkout process with regard to multiple items that were collected from multiple different vendors.

More generally, a single click mechanism or a single checkout mechanism may be used to initiate any desired type of coordinated product transaction involving the one or more products. In some embodiments, the transaction may be a purchase transaction whereby a user places a purchase order for one or more items. Alternatively, or in addition, the transaction may be a redirect transaction that redirects a user to one or more vendor sites (such as e-commerce sites) where the one or more products may be purchased using vendor-specific purchase mechanisms. In other embodiments, the transaction could be a non-commercial transaction, such as a transaction that produces editorial comment involving the products. In the context of the present discussion, purchase transactions may include transactions that result in the direct purchase of the one or more products. Redirect transactions may include transactions that result in the indirect purchase of the one or more products following redirection to one or more e-commerce sites. Non-commercial transactions may include transactions that do not involve product purchases or other commercial transactions. As noted above, one example would be a transaction that produces editorial comment involving the one or more products.

The disclosed subject matter may include a system, device, method and computer program product that may allow a user to take a one or more photos of himself or herself, in order to virtually try-on countless products sold online and/or sold offline, and to see different looks of such products (e.g., clothes, accessories, or the like) shown in a realistic manner on the user's own image. The user may also virtually dress himself or herself by scanning physical codes, such as QR-codes, barcodes, price tags, clothes tags, or the like, captured from physical clothes located in real-life shops; in order to similarly achieve a virtual dressing of the user's image with such items or clothes.

For each product, the user may also receive one or more computed properties, such as the correct size estimation that fits one's body shape and/or measurements. The dressing process may utilize image processing and/or computer vision methods, for example, with regard to the user image (if present) and/or with regard to the product (e.g., clothes) image, and may include additional parameters inserted by the user and/or generated from external resources regarding the user and/or the cloth properties. For example, the user may be asked to manually insert his height and/or weight and/or gender, and such data may be used in order to further improve the output shown to the user. After the dressing process, the user may proceed to purchase a single product, or an entire multiple-item attire or assembly of clothes, from a single vendor or even from multiple different vendors (e.g., online vendors and/or offline vendors), optionally by using a single click mechanism, utilizing a universal digital wallet or payment mechanism.

FIG. 1 illustrates, in accordance with a demonstrative embodiment, a system 2 that may comprise various components or units or modules. These may include a User Handler Module 4, a Product Handler Module 6, a Universal Dressing Module 8, a Universal Wallet Module 10, a Products Web Crawler Module 12, and an Offline to Online Dressing Module 14. The User Handler Module 4 is optional and may be dispensed with if the anchor image does not contain the image of a user or other anthropomorphic entity that requires processing. The Products Web Crawler Module 12 and the Offline to Online Dressing Module 14 are also optional. Other suitable modules or units may also be used.

The system 2 may be used for virtually dressing products (such as clothes) in an anchor image that is displayed on a system or device, such as one of the client devices 16 shown in FIG. 1. The anchor image may or may not contain an image of a user or other anthropomorphic entity. In some embodiments, the products may be from different brands, vendors and e-commerce sites. In FIG. 1, the reference numeral 18 exemplifies network-accessible sources, such as web catalogs or other e-commerce sites, that display clothing products having associated product images. In some embodiments, the user may scan a code attached to physical clothes in a shop, as shown by reference numeral 20. In some embodiments, the purchase of products of the same or different brands from the same or different vendors and e-commerce sites may be consummated immediately, using a one-click universal wallet. In some embodiments, the system 2 may support crawling product data from the web using machine learning; and the data may stay constantly up-to-date.

Some embodiments of the system 2 may comprise or may perform the following: (a) identify at least two products that are available for purchase and have an associated product image, (b) process the product images for virtual dressing to generate a composite digital anchor image that depicts the products in a spatial relationship corresponding to an intended manner of use of the products, and uses product size information to scale the product images to match a scale of the anchor image, (c) display the composite anchor image to a user, (d) display one or more user interface elements to the user in association with the composite anchor image and (e) implement a single-click or single-checkout button or process wherein, responsive to the one or more user interface elements being activated, a coordinated product transaction involving the products is performed whereby the products are sold.

The User Handler Module 4 prepares a user image, which can be taken from different client types, for the virtual dressing process. Using one or more of image processing, computer vision and machine learning, this module only needs a single user image that may be invariant, but is not limited to quality and camera angles in order to create a 3D estimation of the user. The User Handler Module 4 is not limited to using a single image; it may capture more images, videos or the like, for different scenarios (e.g., taking two pictures of the front and back in order to create a 360 degree look). The User Handler Module 104 is further discussed herein, for example, with reference to FIG. 2.

The Product Handler Module 6 may be used to prepare a product image (such as a clothes image) taken from the same or different product resources (such as online vendor catalogs) for the virtual dressing process. Employing one or more of image processing, computer vision and machine learning, this module may need only a single product image that may be invariant, but is not limited to quality and camera angles in order to create a 2D or 3D estimation of the product. Additionally, multiple product images or videos may give a better estimation and be suited for different scenarios. The Product Handler Module 6 is further discussed herein, for example, with reference to FIG. 3.

The Universal Dressing Module 8 virtually dresses a user (or a model or avatar) with one or more different products that may differ in image size, vendor, type, fabric, light, shading, or other properties. The virtual dressing may take into consideration the user pose, user light scene, shading, and real-world gravitation, in order to create the most realistic simulation or emulated image. For each product, Universal Dressing Module 8 may estimate the recommended size for the user and change the simulation accordingly. This module may evaluate the simulation combined with manual or external properties regarding the user and/or the product to give a better outcome. For example, the user may be asked to manually enter or provide his or her height and/or weight and/or gender and/or clothes size (e.g., Small Medium or Large for a T-Shirt). The Universal Dressing Module 8 is further discussed herein, for example, with reference to FIG. 4.

The Products Web Crawler Module 10 allows the automatic or autonomous preparation of any web catalog product for dressing. It may use machine learning in order to get textual information about each product. The Products Web Crawler Module 10 may validate products' textual information in the web catalog. This module may be invariant, but is not limited to the products' vendors. The Products Web Crawler Module 10 is further discussed herein, for example, with reference to FIG. 5.

The Universal Wallet Module 10 provides a secure, safe, quick, and optionally one-click online shopping mechanism enabling the user to efficiently and rapidly purchase multiple different products from one or more different brands, vendors, e-commerce sites or other sources, including from online vendors, offline vendors, real-life stores, brick-and-mortar stores, used or pre-owned online stores or markets (e.g., eBay or CraigsList), or the like. A user may use the Universal Dressing Module 6 to create different looks that can instantly be bought as an entire look, or as an assembly of multiple items. The look may combine different products from different brands, vendors, e-commerce sites and the such, and may optionally be available for purchase as a one-click purchase button or process, or as a multiple-steps purchase process.

The Offline to Online Dressing Module 12 allows users to scan codes such as the QR-code, Barcode, Near Field Communication (NFC) tag, or the like, which may be attached to physical clothes or items in actual real-world shops or locations. This module may allow for an instant virtual dressing experience of the specific in-store item onto the virtual user image, bringing the consumer from offline medium (physical shop/physical clothes) to online medium (application, web, electronic device, or any other platform that shows the simulation on the taken user image). The Offline to Online Dressing Module 14 may further allow a user, that is physically located within a store, to virtually try on a product or an article of clothing, without actually finding and walking to a changing room, waiting in line, taking off clothes, putting on new clothes to try them on, taking off the new clothes, and putting on the user's own clothes; thereby saving the user precious time and efforts, and enabling the user to receive on-the-spot immediate visual feedback with regard to the look of a clothes article or other product that is virtually dressed on an image of the user.

The foregoing features and modules may be platform agnostic, and may operate on different client types (mobile, tablet, desktop, or the like) and/or infrastructures (server, cloud, web based, etc.).

Figure 2:
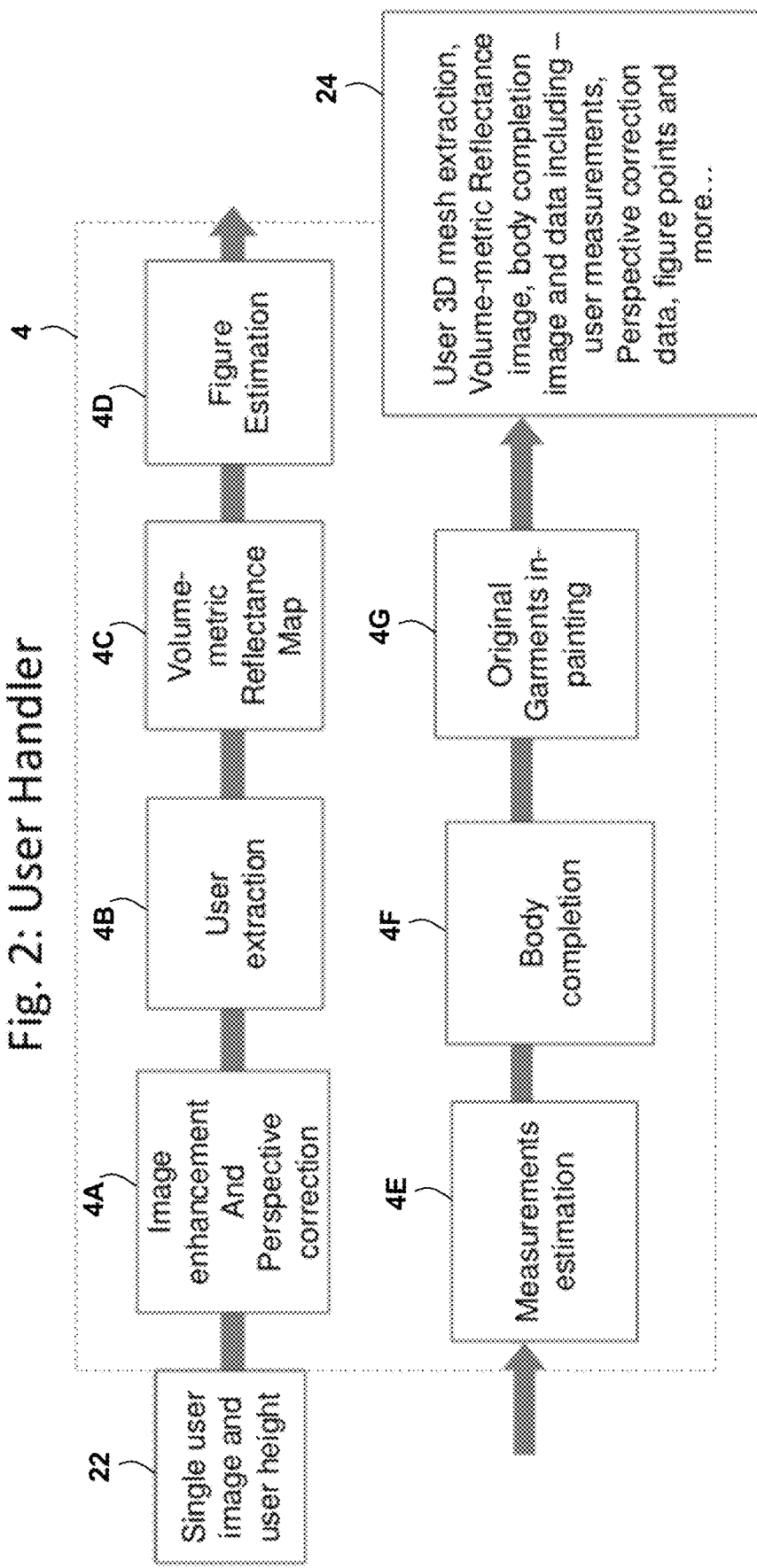
FIG. 2 is a block diagram showing an example User Handler Module of the system of FIG. 1.

An example embodiment of the User Handler Module 4 is illustrated in FIG. 2. This embodiment may comprise or utilize one or more of the following processes or sub-modules: Image enhancement and perspective correction 4A, User extraction 4B, Volume-metric reflectance map 4C, Figure estimation 4D, Measurements estimation 4E, Body completion 4F, and Original garments in-painting 4G. FIG. 2 illustrates that the User Handler Module 4 may receive, as an input 22, at least one user image and, optionally, user size information, such as a user height. FIG. 2 illustrates that the User Handler Module 4 may generate, as an output 24, one or more of a user 3D mesh extraction, volume-metric reflectance image, a body completion image and data including user measurements, perspective correction data, figure points and more.

The Image enhancement and perspective correction process 4A may be used to enhance a user image before the User extraction process 4B is invoked. Various enhancements may be performed to fix problems resulting from improper usage of the camera including, but not limited to a dark photo, a blurry photo, a noisy photo, and a grayish photo (very low saturation). The same applies, but is not limited to multiple photos and/or a video. The process 4A may also correct user distortion caused by different camera angles using the user's height. This allows the process 4A to recreate the user coordinates in a 3D world (understanding, but not limited to the user 3D surface, one's distance from the camera, and the correct perspective distortion to add to the products that will be dressed on the user in the dressing process). Further operational details of the Image enhancement and perspective correction process 4A will become apparent from subsequent portions of the present disclosure.

The User extraction process 4B (also known as segmentation) may be used to extract the user from the background of a user image. Artificial intelligence techniques may be employed in order to distinguish between the user's body and clothes from the background.

The process 4B may be invariant, but not limited to different user poses and different backgrounds. Further operational details of the User extraction process 4B will become apparent from subsequent portions of the present disclosure.

The Volume-metric reflectance map process 4C may be used to create a 3D light map of a user. Machine learning and computer vision algorithms may be employed in order to create a user scene light map used in the dressing process. The light map creation may be invariant, but not limited to the user's original colors and shapes of the clothes and skin color. The process 4C may also create the 3D surface for the user using the user's height. Further operational details of the Volume-metric reflectance map process 4C will become apparent from subsequent portions of the present disclosure.

The Figure estimation process 4D may be used to estimate a user's figure under the user's clothes. Machine learning and image processing techniques may be employed in order to interpolate the user's body in areas where the skin is not visible because of, but not limited to clothes, light, and shadows. The process 4D may be invariant, but not limited to the user's pose and original clothing type, and the camera's perspective distortion. Further operational details of the Figure estimation process 4D will become apparent from subsequent portions of the present disclosure.

The Measurements estimation process 4E may be used to estimate the user's body measurements. Machine learning and computer vision techniques may be employed in order to correctly estimate such measurements. The process may estimate, but is not limited to the bust, waist, hips, and, for women, the cup size; and/or other suitable properties of a person. Further operational details of the Measurements estimation process 4E will become apparent from subsequent portions of the present disclosure.

The Body completion process 4F may be used to create an artificial user body where clothes are covering the user's body. Computer vision and image processing may be employed in order to extrapolate the correct, but not limited to color, light, and shadows on the user's skin in areas where the body was hidden due to clothes. Further operational details of the Body completion process 4F will become apparent from subsequent portions of the present disclosure.

The Original garments in-painting process 4G may be used to erase the original user's clothes which are outside the user's figure estimation. In-painting techniques may be employed in order to estimate the background that was hidden behind the clothes. The clothes in-painting may be invariant, but not limited to the user's clothing type, clothing fabric, and background colors. Further operational details of the Original garments in-painting process 4B will become apparent from subsequent portions of the present disclosure.

Figure 3:
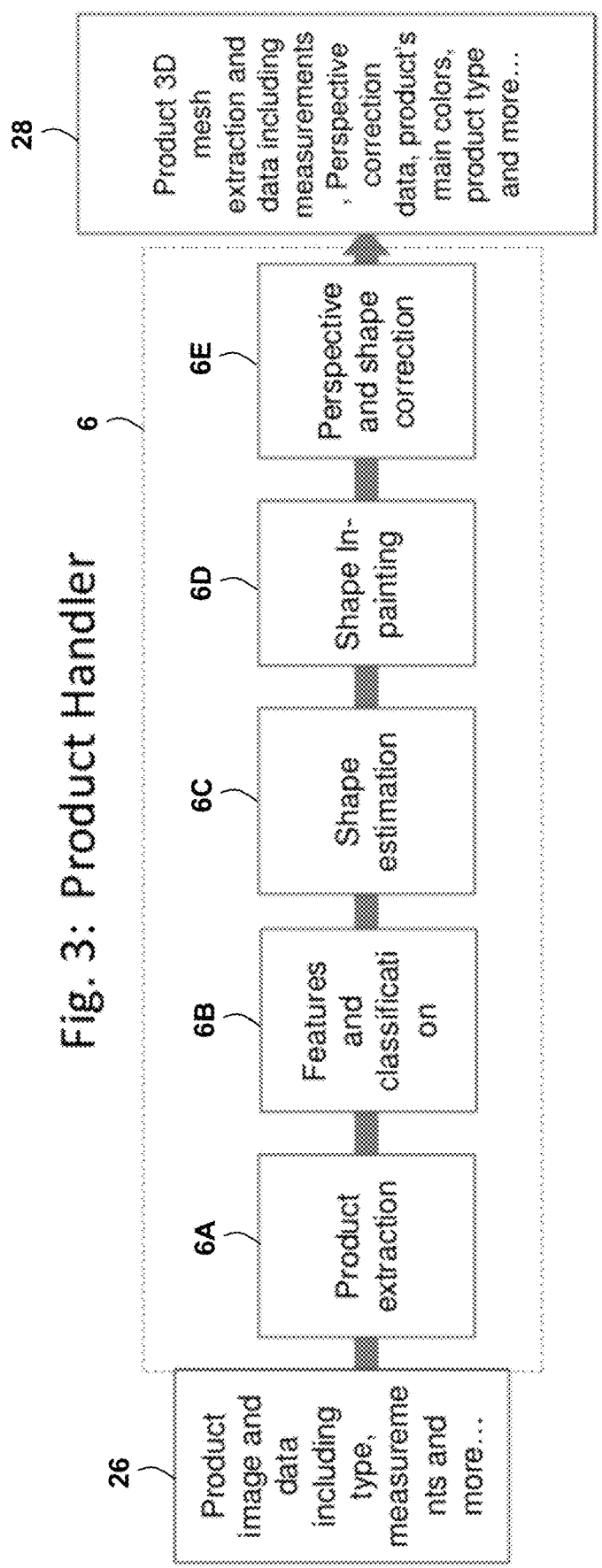
FIG. 3 is a block diagram showing an example Product Handler Module of the system of FIG. 1.

An example embodiment of the Product Handler Module 6 is illustrated in FIG. 3. This embodiment may comprise or utilize one or more of the following processes or sub-modules: Product extraction 6A, Features and classification 6B, Shape estimation 6C, Shape In-painting 6D, and Perspective shape correction 6E. FIG. 3 illustrates that the Product Handler Module 6 may receive, as an input 26, at least one product image and data that may include product type, measurements or size, or other information from which measurements or size may be determined, and more. FIG. 3 illustrates that the Product Handler Module 6 may generate, as an output 28, a product 3D mesh extraction and data including measurements, perspective correction data, product main colors, product type and more.

The Product extraction process 6A may be used on a product image to extract the product from the background and from a model wearing the product (if a model exists). Artificial intelligence techniques and textual data may be employed in order to distinguish between the model's body, the background, and different clothes. The process may be invariant, but not limited to different model poses, backgrounds, product shape, angles, and different product vendors. Further operational details of the Product extraction process 6A will become apparent from subsequent portions of the present disclosure.

The Features and classification process 6B may be used to find fundamental features of a product (shoulders, sleeves, etc.). If necessary, where textual information doesn't exist, the method may classify the product into sub-categories, such as by using machine learning and computer vision. For example a shirt may be classified according to whether it is long sleeve, tight, t-shirt, etc. Further operational details of the Features and classification process 6B will become apparent from subsequent portions of the present disclosure.

The Shape estimation process 6C may be used to interpolate product shape if a product was hidden, such as by a model's pose. Machine learning and curve fitting techniques may be employed for this purpose. The process may be invariant, but not limited to the model's pose and the areas hidden by a model. Further operational details of the Shape estimation process 6C will become apparent from subsequent portions of the present disclosure.

The Shape in-painting process 6D may be used to fill in hidden areas of a product that were interpolated by the shape estimation process 6C. Image processing and computer vision may be employed in order to fill the hidden areas and may be invariant, but not limited to the hidden areas' shapes, product color, texture, light, shadow, and folds. Further operational details of the Shape in-painting process 6D will become apparent from subsequent portions of the present disclosure.

The Perspective and shape correction process 6E may be used to prepare a product for the dressing by, but not limited to, giving the product a 3D volume, perspective distortion, and realistic color (if the product wasn't worn by a model). If the product was worn by a model, the process may prepare the product for dressing by, but not limited to, extrapolating inner parts of the product that were hidden by the model's body. Further operational details of the Perspective and shape correction process 6E will become apparent from subsequent portions of the present disclosure.

Figure 4:
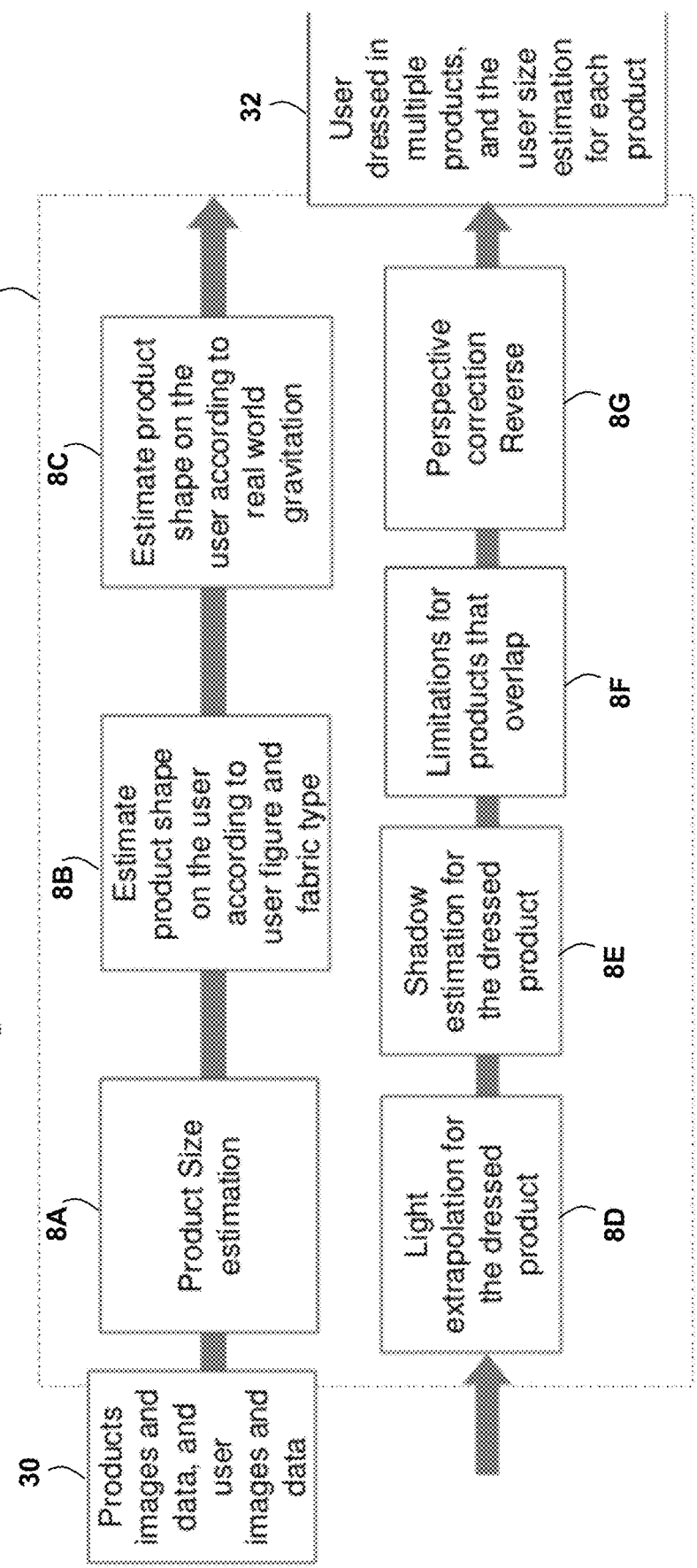
FIG. 4 is a block diagram showing an example Universal Dressing Module of the system of FIG. 1.

An example embodiment of the Universal Dressing Module 8 is illustrated in FIG. 4. This embodiment may comprise or utilize one or more of the following processes or sub-modules: Product Size Estimation 8A, Estimate product shape on the user according to user figure and fabric type 8B, Estimate product shape on the user according to real world gravitation 8C, Light extrapolation for the dressed product 8D, Shadow estimation for the dressed product 8E, Limitations for products that overlap 8F, and Perspective correction reverse 8G. FIG. 4 illustrates that the Universal Dressing Module 8 may receive, as an input 30, one or more product images and data, and user images and data. FIG. 4 illustrates that the Universal Dressing Module 8 may generate, as an output 32, an anchor image depicting one or more products arranged and sized in a virtual dressing display that may include a user or other anthropomorphic entity and a user size estimation for each product.

The Product size estimation process 8A may be used to estimate the recommended size for each product dressed on the user according, but not limited to a product size chart, type, and fabric. Machine learning may be used to estimate the recommended size for each part of a user's body. For example, the process 8A may estimate if the product is tight, relaxed, or perfectly fits on the waist. The process 8A may be invariant, but not limited to different vendors and product size charts. Further operational details of the Product size estimation process 8A will become apparent from subsequent portions of the present disclosure.

The Estimate product shape on the user according to user figure and fabric type process 8B may be used to transform a product on a user using computer vision. The process 8B may take into consideration, but is not limited to product fit, size, shape, and type, in order to dress the user as accurately as possible. This process may be invariant, but not limited to product image size, product vendor and pose. Further operational details of the Estimate product shape on the user according to user figure and fabric type process 8B will become apparent from subsequent portions of the present disclosure.

The Estimate product shape on the user according to real world gravitation process 8C may be used to transform a product on a user using computer vision. The process 8C may take into consideration the user pose and gravitation of the real world and how it affects the product on the user. Further operational details of the Estimate product shape on the user according to real world gravitation process 8C will become apparent from subsequent portions of the present disclosure.

The Light extrapolation for the dressed product process 8D may be used to extrapolate a 3D volume-metric light map of a user to the products dressed on the user using computer vision algorithms. This generates the products, the user scene light and shadow that cause the dressed product to look more realistic. The process 8D may be invariant, but not limited to the products' types and colors. Further operational details of the Light extrapolation for the dressed product process 8D will become apparent from subsequent portions of the present disclosure.

The Shadow estimation for the dressed product process 8E may be used to create an artificial shadow on a user's body using computer vision algorithms. The shadows stem from the products dressed on the user; for example, short sleeves create a shadow on the arms. The process 8E may be invariant, but not limited to the product type and color and user pose. Further operational details of the Shadow estimation for the dressed product process 8E will become apparent from subsequent portions of the present disclosure.

The Limitations for products that overlap process 8F process may be used to create limitations and conditions of dressing multiple products. For example, if a tight shirt is above a high-waist puffy skirt, then the skirt will be tighter on the body in the area where the products overlap. The skirt will start to expand after the overlapping area ends. A combination of real world physics, fashion rules, and computer vision algorithms may be employed such that the process may be capable of handling every type of overlapping product, including those products that do not necessarily exist in the real world (such as pants on a skirt). The process 8F may be invariant, but not limited to the products vendor and size and user pose. Further operational details of the Limitations for products that overlap process 8F will become apparent from subsequent portions of the present disclosure.

The Perspective correction reverse process 8G may be used after virtually dressing the user in multiple products to reverse the perspective and distortion correction that was performed on the user image by the User Handler Module 4. This action causes the products to get the same perspective and distortion as the user had, making the simulation more realistic. Further operational details of the Perspective correction reverse process 8G will become apparent from subsequent portions of the present disclosure.

Figure 5:
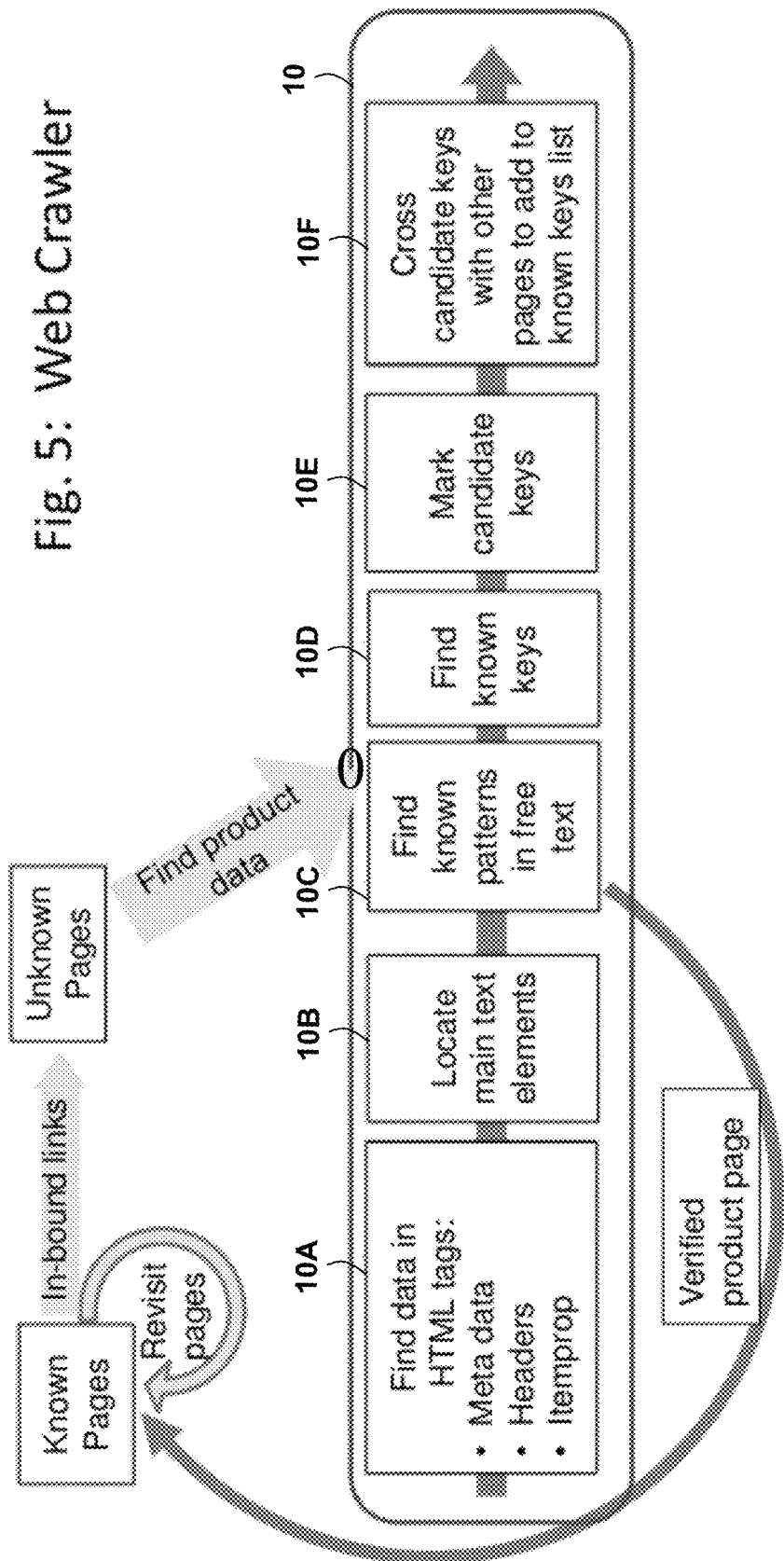
FIG. 5 is a block diagram showing an example Web Crawler Module of the system of FIG. 1.

An embodiment of the Products Web Crawler Module 10 is illustrated in FIG. 5. The base of the Products Web Crawler Module 10 is a learning system to track scanned pages. Navigation through the different pages of a website is done by following inner website links. Each page visited is identified as a product page (through data gathering explained below) or marked "unneeded" for further update. The process of updating data from a previously visited page is the same from this point forward. The embodiment of FIG. 5 may comprise or utilize one or more of the following processes or sub-modules: Find data in HTML tags 10A, Locate main text elements 10B, Find known patterns in free text 10C, Find known keys 10D, Mark Candidate keys 10E, and Cross candidate keys with other pages to add to known keys list 10F.

The Find data in HTML tags process 10A may be used to locate data in common HTML tags according to W3 conventions, which may include but not limited to: Meta data tags, headers and Itemprop attributes. Meta data tags provide trusted data provided by the page owner Headers hold major information in any web page. Itemprop attributes represent common HTML attributes found in well-formed e-commerce websites. Elements with the Itemprop attribute specify data such as price, brand, name, category, etc. Further operational details of the Find data in HTML tags process 10A will become apparent from subsequent portions of the present disclosure.

The Locate main text elements process 10B may be used to scan web pages to find large elements containing text such as description or summery fields. Many sites allow free text sections or lists with abundant information. Further operational details of the Locate main text elements process 10B will become apparent from subsequent portions of the present disclosure.

The Find known patterns in free text process 10C may use a machine learning algorithm to locate patterns and known data structures (such as key-value pairs or table structure). Further operational details of the Find known patterns in free text process 10C will become apparent from subsequent portions of the present disclosure.

The Find known keys process 10D may be used to compare keys in found data against a known keys list and locate desired data. Further operational details of the Find known keys process 10D will become apparent from subsequent portions of the present disclosure.

The Mark Candidate keys process 10E may be used to mark unknown keys and enter them in a key candidate list. Further operational details of the Mark Candidate keys process 10E will become apparent from subsequent portions of the present disclosure.

The Cross candidate keys with other pages to add to known keys list process 10F may be used to mark recurring keys in multiple pages with the same connotation and enter them to the known keys list. A machine learning algorithm may be employed for this purpose. Further operational details of the Cross candidate keys with other pages to add known keys list process 10F will become apparent from subsequent portions of the present disclosure.

The system 2 may be used to provide a system and method for virtually dressing clothes using an anchor image that may or may not include an anthropomorphic entity. In some embodiments, the system 2 may facilitate virtually dressing clothes on users, based on one or more full user body images, using image processing, computer vision and machine learning. In some embodiments, the user may take several pictures or videos. In some embodiments, additional parameters and preferences, from the user and or external resources, may be taken into account. In some embodiments, the clothes or products are from different brands, vendors and e-commerce sites. In some embodiments, the user may scan a code attached to physical clothes in a shop. In some embodiments, the method may enable for shopping for clothes from different brands, vendors and e-commerce sites immediately, using a one-click universal wallet. In some embodiments, the method may comprise crawling clothes data from the web using machine learning; and the data stays constantly up-to-date.

Some embodiments may comprise or may perform the following: (a) virtual dressing, by overlaying or inserting or otherwise combining, a two-dimensional image of a product (two-dimensional images of several products), onto a two-dimensional image of a user; (b) identification of the precise body contour of a particular user, based on one or more images of that user in which he wears one or more clothes; (c) identification and extraction of the body contour of a particular user, based on a video clip that shows that user; (d) generation of a lighting map and/or a volume map, based on a user image, even if the user is wearing clothes or items that have different colors or that have different shading levels; (e) adding, removing, enhancing and/or modifying one or more portions or regions of an image of a product, and/or of an image of a user, in order to generate a realistic appearance of a combined user-and-product image; (f) enabling the user to purchase one item, or two or more items, which may be sold or made by different vendors, optionally by using a single-click or single-checkout button or process; (g) optionally, performing one or more of the methods or features that are described above or herein, with regard to (or by utilizing) a set of images, or a video clip, or a three-dimensional representation or a stereoscopic image of the user and/or of the product, and/or generating as output such three-dimensional representation or a stereoscopic image of simulated combined user-with-product.

The system 2 may process a user's image(s) of himself or herself, and may optionally extract or determine or estimate, for example, user gender, user height, user dimensions; without necessarily requiring the user to manually input such data; and optionally by utilizing machine learning to increase the type or number of images that the system is able to accurately process. Additionally, analysis of "big data" repositories and data-mining may enable the system 2 to suggest to the user similar items, or items that the system estimates that may be of interest to the user, based on his past history of virtual dressing.

Figure 6:
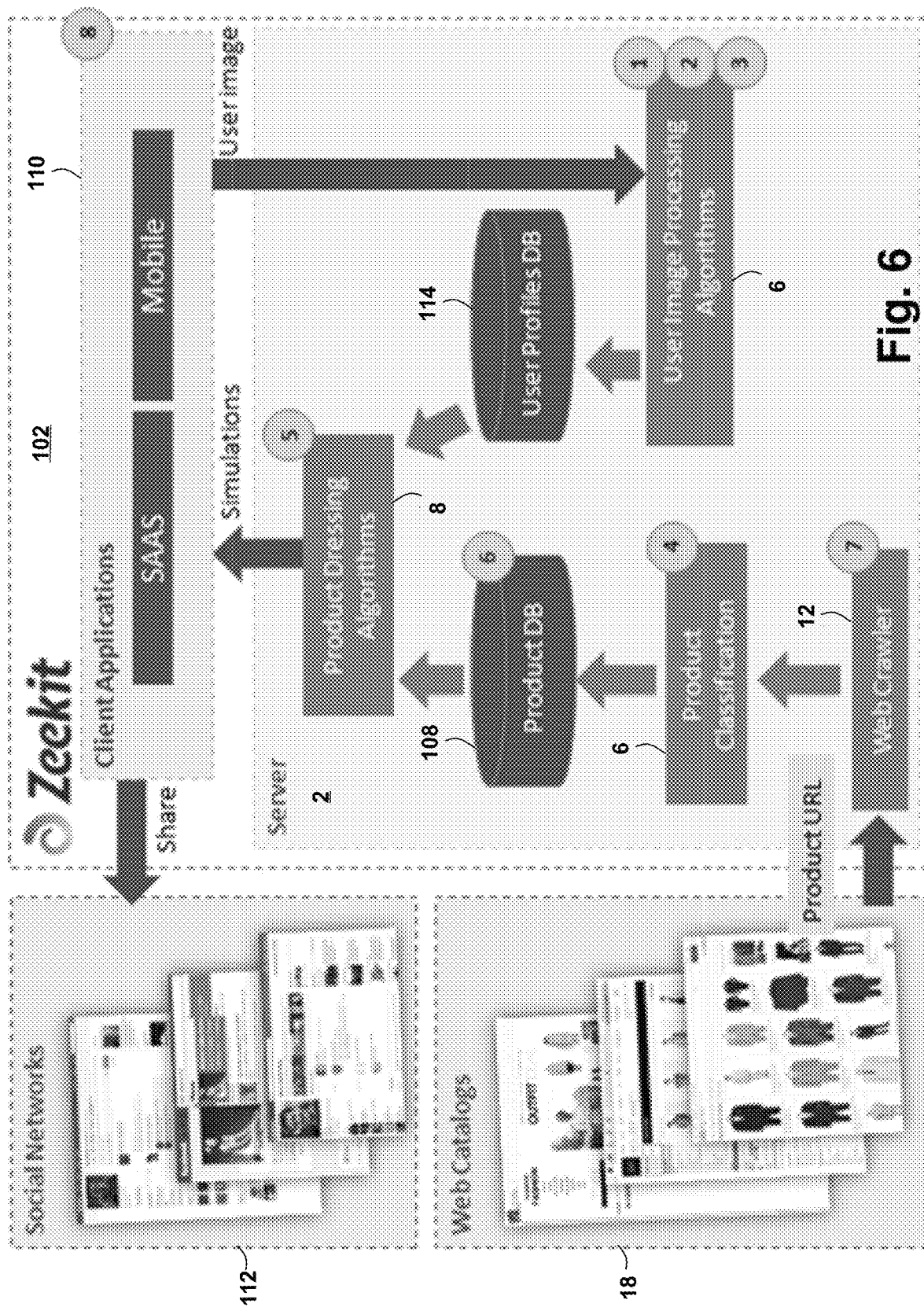
FIG. 6 is a block diagram showing another example system that may be implemented in accordance with the present disclosure.

FIG. 6 illustrates a system 102 in accordance with some embodiments of the present disclosure. The system 102 includes the system 2 implemented in a server environment. The Universal Dressing Module 8 of the system 2 is shown in FIG. 6 as receiving input from two branches of modules of the system 2, namely, a product data processing branch 104 and a user image processing branch 106.

In the product data processing branch 104 of the system 2, the Products Web Crawler Module 12 may crawl the Internet to obtain product data, including product URL data, from one or more network-accessible sources 18, such as web catalogs or other e-commerce sites, that display clothing products having associated product images web catalogs or other online sources. The product images and data are provided to the Product Handler Module 6. The Product Handler Module 6 performs performs such operations as product classification into classes or categories, as well as product image enhancement and improvement. The output 28 of the Product Handler Module 6 (see FIG. 3) including the product image and product data may be stored into a product database 108, that in turn may feed the Universal Dressing Module 8.

In the user image processing branch 106 of the system 2, a user image may be obtained from a mobile or non-mobile system or application or electronic device (such as one of the client devices 16 of FIG. 1) running a client application 110, or from another source (e.g., from a profile page of the user on a social network 112). The user image is processed, analyzed and improved by the User Handler Module 4, and may be stored in a user profiles database 114, together with other user data that is obtained or extracted or received. The output of the Universal Dressing Module 8 may be provided to the user for display via his or her application or electronic device 110 running a client application 110, and may be further shared or sent by the user to selected recipients, such as via the social networks 112. The entity that receives the output of the Universal Dressing Module 8 could also be a system from which a product image was obtained, such as a vendor web server hosting an e-commerce website that offers the product for sale. In that case, a user interface element, such as a "Try It On" button, could be incorporated into the webpage to allow users to try on the product using the functionality of the system 2 (see FIG. 38). Clicking this user interface element may result in a composite anchor image being generated and displayed via a user's web browser to show the product virtually dressed on the user. The composite anchor image could be displayed within the same webpage that depicts the product or in a separately generated webpage. In an embodiment, the client application 110 that provides the user interface element, receives the output of the Universal Dressing Module 8, and generates the composite anchor image, could be an SAAS application.

In some embodiments, the User Handler Module 4 of the system 2, via its User extraction process 4B, may operate to separate the image of a user's body by itself, from any background that may be shown in the user's image. For example, a user's image may be analyzed by using a computer vision process, in order to locate multiple (e.g., eight) initial point of interest: right shoulder, left shoulder, right elbow, left elbow, right wrist (or palm), left wrist (or palm), right foot, left foot. Optionally, two (or more) images, or a video clip, or stereoscopic image(s) of the user, may be analyzed; may be selected out of a plurality of images, or out of a video clip containing frames; and may be aligned to each other. Optionally, a volume map may be generated, indicating the three dimensional volume and/or distance and/or depth of each point or region in the image of the user. Optionally, a computer vision algorithm may be used, or other image processing techniques, to trace around the determined shape or contour of the particular body of the particular user as shown in the image; and to cut-off or remove or discard the data of the background, leaving only a "net" image of the user himself, or a masking component of the user's image by itself and sans its background.

In some embodiments, the User Handler Module 4 of the system 2, via its volume-metric reflectance map process 4C, may generate a volume-metric reflectance map. The Universal Dressing Module 8 of the system 2, via its Light extrapolation for the dressed product process 8D, may apply the user volume-metric reflectance map to the anchor image during virtual dressing. The Universal Dressing Module 8 of the system 2, via its perspective correction reverse process 8G, may perform equalization and image enhancement. For example, a blurry clothing article that was originally worn by the user in his or her original image may be replaced by a focused or non-blurry image of the target product intended for virtual dressing, or in some implementations, with an intentionally reduced-sharpness or increased-blur version of the product.

The foregoing is based on applicants realization that typically, a user's image is captured in non-optimal conditions and/or by using a smartphone or tablet, thereby generating generate a user image having noise, blur, insufficient light, shaded portions, or other imperfections; whereas, in contrast, a product's image is typically or often captured by a professional photographer in a well-it photography studio. Applicants have realized that an attempt to merely insert a resized version of a studio-quality product image, into a blurry or amateur-quality photograph of the user, produces non-realistic results. Accordingly, some implementations of the system 2 may intentionally introduce noise and/or blur and/or shades and/or other imperfections, into a high-quality image of the product, prior to (or during) the insertion of such product image into the user's image; in order to thereby generate a combined image that features a generally constant level of quality, and thereby avoiding a situation in which the combined image shows a blurry user "virtually wearing" a high-quality image of a product. Optionally, the user's image may be enhanced or improved, e.g., by sharpening, noise removal, noise reduction, artifacts removal or reduction, anti-blur processing, lighting equalization, or other enhancements, in order to prepare the user's image to be close to the quality of the product image that needs to be adapted and inserted into it. Similarly, a volume-metric map, a lighting map, or other image-related data may be modified or enhanced, in order to subsequently allow compatible fusion of the user image with the product image.

In some embodiments, the Universal Dressing Module 8, via its perspective correction reverse process 8G, may utilize one or more superposition algorithms, in the frequency domain and/or in the time domain, and may optionally fuse together insights from two or more such algorithms. In some implementations, for example, frequency domain analysis may be performed by a Zheng and Chellapa algorithm, a time domain or temporal domain analysis may be performed by a Horn and Ikeuchi algorithm, and insights from both may be fused or accumulated.

In some embodiments, the Universal Dressing Module 8, via its perspective correction reverse process 8G, may perform unification of the blur level, sharpness level, lighting, noise level, and/or other features of the user image and the product image(s) in order to contribute to a realistically-looking combined image. For example, blur level may be determined by using a Park algorithm and/or by Cepstral image analysis, to detect the strength (or intensity) of the blue and/or the blue direction. Optionally, a blue kernel may be determined, and may be applied via convolution onto the image(s) of the product, in the virtual dressing process.

Similarly, unification of the noise level of the user and product images may be respectively performed. The noise level in the user image may be estimated or detected, for example, by using Kernel Laplacian algorithm for image convulation, and/or by using Fast Noise Estimation algorithm on the resulting data, thereby generating the noise level (e.g., the noise standard deviation) of the user image, and subsequently utilizing such or similar noise level in order to intentionally introduce a matching noise level to the product image(s) that is/are being combined with the user image.

Similarly, unification of the lighting conditions may be performed, for example, based on statistical analysis of one or more regions or the user image, particularly of the human eye area or the white-portions therein, and optionally using such computed result as an anchor value for the lighting level of the user image, and subsequently utilizing such computed data in order to modify, or particularly to reduce or increase, the lighting level in the product image(s), in order to contribute to a realistically looking combined image.

In some embodiments, the User Handler Module 4 of the system 2, via its Body completion process 4F, may perform recognition and/or reconstruction of the user's body shape or body contour. For example, an initial mask of the image of the user may be extracted or isolated by the User extraction process 4B, and a volume-metric reflectance map generated by the Volume-metric reflectance map process 4C, as well as image equalization performed by the Image enhancement and perspective correction process 4A, may be used in order to improve the user image. These operations may also particularly detect that the user image is of the type of "mirror selfie" in which the user stands in front of a large mirror and captures a "selfie" image by holding a smartphone or a tablet or other device, typically near or at the user's chest or stomach area; optionally by performing image analysis processes, which may detect or recognize a smartphone or a tablet that appears in the image, and/or by taking into account reflected flash illumination that is reflected from the mirror in such situation.

Optionally, the User Handler Module 4, via its Figure Estimation process 4D, may generate a correspondence between the user's image and a given mask, for example, by tilting or slanting body parts (e.g., arm, elbow, palm, hand) that are shown in the user's image in order to correspond to a pre-defined mask or visual template. Upon general or raw correspondence, a fine-tuning process may be performed, to fine-tune the correspondence and/or to correct imperfections in the user's image (e.g., to complete or to add body portions that were hidden or obstructed in the original user image). Optionally, user characteristics or dimensions may be deduced, based on image analysis, ratio calculations, and/or by using a height input (e.g., input 22 of FIG. 2) that may be provided by the user.

The User Handler Module 4 may thus convert a user image, in which the user was standing in a non-neutral position (e.g., one arm behind his back; or, one arm folded and holding a smartphone over the chest; or, two arms bent and holding the waist), into a mask or template of a neutrally-standing depiction of the user. Optionally, a user's image that is not fully squared towards the camera, or that is slanted or tilted, may be modified to appear generally aligned towards the camera. The User Handler Module 4 may modify or cure such deficiencies. FIGS. 7 and 8 are illustrative. In FIG. 7, a user image depicts the user's two arms being bent and holding the waist. In FIG. 8, a user image depicts a mirror selfie with of the user's one arm folded and holding a smartphone. In both cases, these issues may be identified and corrected so that the arms and hands are placed in a neutral position (not shown), such as with both arms and hands at the user's sides.

Figure 9:
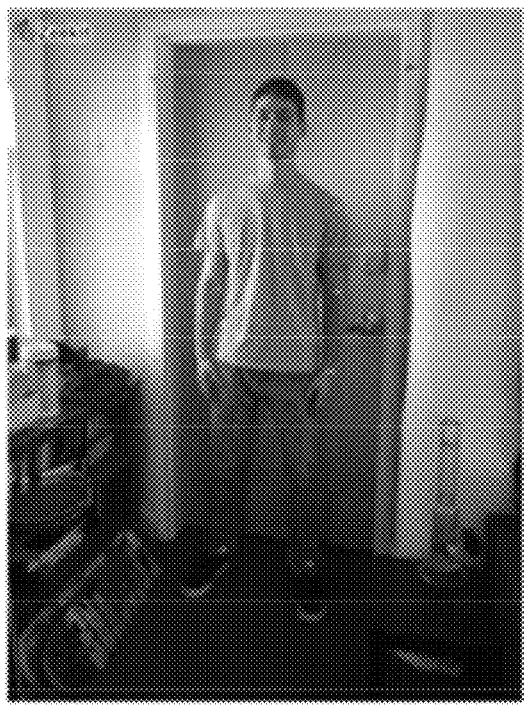
FIG. 9 is a user image illustrating certain image processing that may be performed in accordance with the present disclosure.
Figure 10:
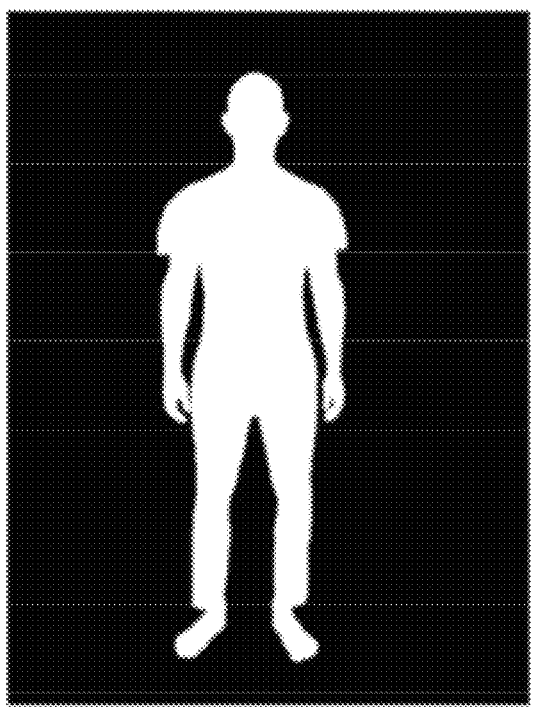
FIG. 10 is a user mask corresponding to the user image of FIG. 9 resulting from certain image processing that may be performed in accordance with the present disclosure.

In some embodiments, the User Handler Module 4, via its Figure Estimation process 4D, may convert an original user image as shown in FIG. 9 into a user mask or template as shown in FIG. 10.

Applying the example processing as described above, embodiments of the User Handler Module 4 may proceed to process: (a) the original user image, (b) the "net" or cut-out image of the user's body only, sans the background, and (c) a mask or template corresponding to a user's body, and may proceed to generate a user-image mask that depicts the net contour of the body of the user, while also removing "bloated" areas that appear to be bloated due to the fact that the user is wearing clothes in his own image. The User Handler Module 4, via its Figure estimation process 4D, may take into account various sizes and shapes of clothes, that the user may be wearing in his or her originally-captured image, which may distort or bloat the body contour. The Figure estimation process 4D may estimate the actual non-bloated or non-distorted contour or dimensions of the user (and his or her particular body parts) by analyzing one or more user image in order to extract volume or depth information. The User Handler Module 4, via its Measurements estimation process 4E, may estimate the dimensions of the torso of the user and/or of other relevant body parts (e.g., height and width of shoulders, chest, stomach, waste, pelvic area). The User Handler Module 4, via its Image enhancement and perspective correction process 4A, may correct or modify the angular perspective of the user's image, may modify or correct or align the appearance of body parts in the user's image, and may modify or correct the horizontal perspective in order to generate an image of the user in a neutral position.

Figure 11:
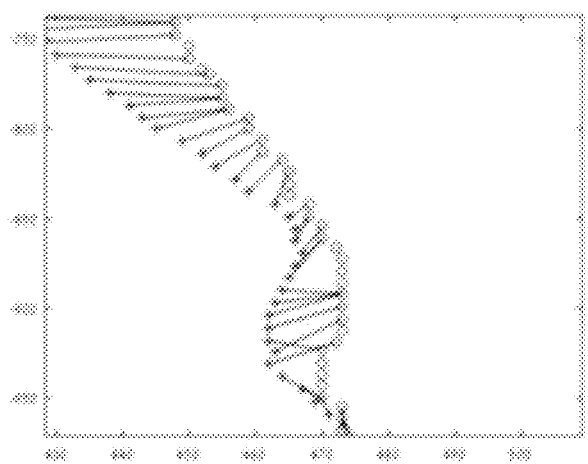
FIG. 11 is a diagram illustrating matchings between points in a user image and a user mask image.
Figure 12:
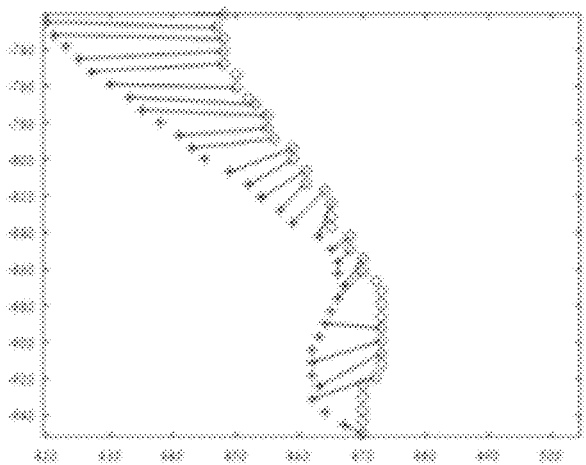
FIG. 12 is a diagram illustrating improved matchings between points in a user image and a user mask image resulting from certain image processing that may be preformed in accordance with the present disclosure.

The User Handler Module 4, via its Body completion process 4F, may cure inconsistencies or imperfections in the user's image, by smoothing and/or improving and/or modifying the contour line of the user's body image. For example, a Cost Matrix algorithm for matching among points, describing the distance(s) between histograms, may cause a match between two (or more) points in the user's contour image and one single point in the generic mask or template. The Body completion process 4F may intentionally avoid or cure this phenomena, by ensuring that each point in the user's body image is matched to a single and different point in the mask or template. Additionally or alternatively, the Body completion process 4F may cure or avoid a situation in which a cross-matching of points occurs, such as, a lower point (A1) in the user image is matched to an upper point (B2) in the mask, whereas an upper point (A2) in the user image is matched to a lower point (B1) in the mask, thereby creating an "X" shaped matching, rather than two non-intersecting matching lines; and the system may cure of avoid this, by matching A1 to B1, and matching A2 to B2, to avoid such cross-matching. Optionally, local smoothing of the line or the curve may be performed, as part of such modification, and the cross-matching demonstrated in FIG. 11 may be corrected to non-crossing matches as demonstrated in FIG. 12.

In some embodiments, the Product Handler Module 6 of the system 2 may receive a product image, such as a clothing article that is worn by a human model. The Product extraction process 6A may perform product segmentation and classification. An equalized volume-metric reflectance map may be generated by the Features and classification process 6B and utilized (e.g., in conjunction with an equalized lighting map), and textual information or meta-data about the product may be obtained (in some cases with assistance from the Products Web Crawler Module 12) for product classification by the Features and classification process 6B. The Shape estimation process 6C may identify uncovered body parts (e.g., arms of the human model, who is wearing a T-shirt), and may perform separation among multiple clothing items that appear in the image (e.g., between the T-shirt and the pants, worn by the human model who is modeling the T-shirt). The internal and/or external boundaries of the product (e.g., the T-shirt) may be cut.

Optionally, contour or external boundaries of the product may be automatically completed by the Shape estimation process 6C if some regions are missing (e.g., due to being obstructed by the hand of the human model). Optionally, the area or surface of such hidden or obstructed portions of the product may be completed or filled-in by the Shape In-painting process 6D. The Perspective and shape correction process 6E may cure or correct angular perspective of the product image, and/or perform horizontal alignment towards the camera if the original product image was not properly aligned. The Product Handler Module 6 may thus generate a "net" image of the product, sans the modeling human, after filling-in missing portions or obstructed portions or hidden portions, removal of internal portions; curving of a lower-edge of the item (e.g., shirt) in order to provide a realistic non-linear edge view; and/or other suitable modifications or corrections.

In some embodiments, the Product Handler Module 6, via its Product extraction process 6A, may convert a product image into a product mask, and the User Handler Module 4, via its User extraction process 4B, may convert a user's image into a user body mask. The product mask and the user mask may correspond to one another. This is illustrated in FIGS. 13 and 14. Such conversions may be performed in advance for each new user and stored in the user profiles database 106 (see FIG. 6), and for each new product enrolled or added to the product database 104 (see FIG. 6). This enables the subsequent processing of "virtual dressing" to be rapid and efficient, and to build-upon previously-prepared masks/templates of the product and of the user.

Figure 15:
FIG. 15 is a product image obtained from a product image source.
Figure 16:
FIG. 16 is a modified product image resulting from certain image processing that may be performed in accordance with the present disclosure.

As part of the preparation of the product mask, portions of the product image may be removed, added, completed, or modified. For example, if an original product image (as shown in FIG. 15) depicts a shirt that is not worn by a human model, then the top area of the image shows a shirt region that should be hidden or obstructed if such shirt is later superimposed or overlayed upon an image of the user that performs virtual dressing. Therefore, such top area may be cut or discarded or carved-out from the image, in order to allow the product mask to be ready for virtual fitting upon the user's image. Accordingly, a "full" image of the shirt (as shown in FIG. 15), may be converted to a "carved out" image of the shirt (as shown in FIG. 16). This processing may be performed by the Product extraction process 6A of the Product Handler Module 6.

In the above example, applicants have realized that this particular task may require the Product extraction process 6A to implement a highly-sensitive or highly-accurate edges detection algorithm, since the internal portion of the original shirt image has colors that are almost identical to the colors of the external portions of the shirt. Optionally, the Product extraction process 6A may utilize textual information or contextual analysis in order to determine automatically that this item is a "buttoned shirt", and to estimate that the edges detection algorithm should run at high accuracy at the top-central area of the image in which a collar typically exists.

Figure 17:
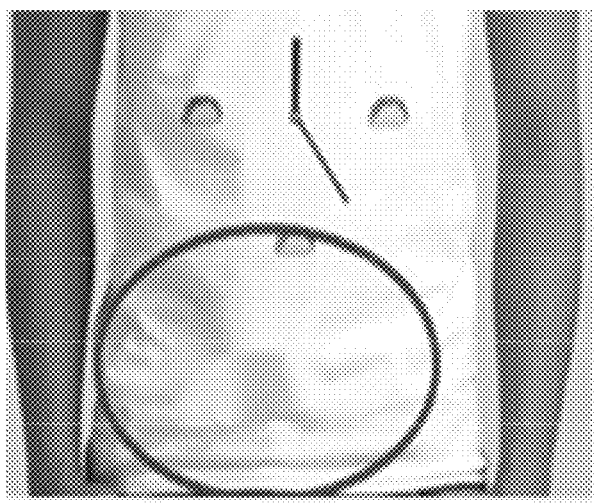
FIG. 17 is a product image that has been modified to add wrinkle effects using certain image processing that may be performed in accordance with the present disclosure.
Figure 18:
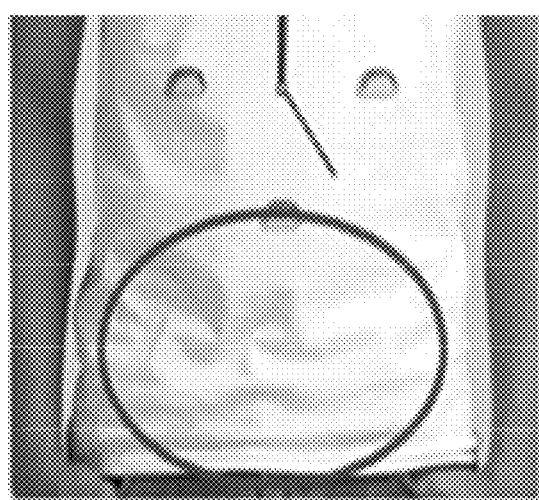
FIG. 18 is another product image that has been modified to add wrinkle effects using certain image processing that may be performed in accordance with the present disclosure.

In some embodiments, the Product Handler Module 6, via its Perspective and shape correction process 6E, may add, reduced, create and/or modify Wrinkle effect(s) on the product image or product mask, in order to improve the realistic appearance of the product when virtually fit over an image of the user. For example, FIGS. 17 and 18 illustrate added wrinkle effects, with FIG. 17 showing low-quality wrinkle effects with square-shaped wrinkles, and FIG. 18 showing high-quality wrinkle effects with non-square wrinkles that appear more realistic. The improved wrinkle effect of FIG. 18 may be achieved, for example, by ensuring that each pixel that is missing or modified, is completed by taking into account the information from at least two (or at least three, or at least four, or at least N) neighboring pixels.

Figure 19:
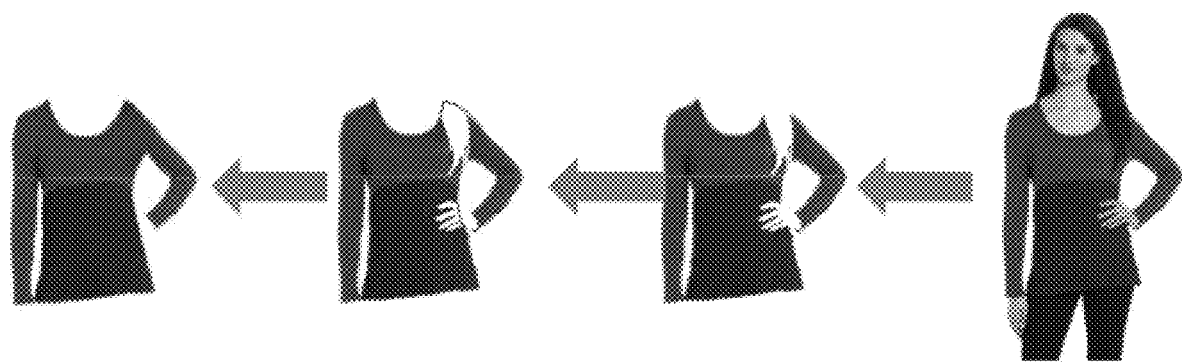
FIG. 19 is a product image that has been extracted from a model and modified to paint in portions of the product using certain image processing that may be performed in accordance with the present disclosure.

In some embodiments, the Product Handler Module 6, may further process a product image by completing hidden or obstructed regions of the product. In FIG. 19, a Dress (product) is worn by a human model, with two obstructions, namely, the model's hair obstructs a portion of the top side of the dress, and the model's fingers obstruct a portion of the middle area of the dress. As demonstrated in FIG. 19, the Shape estimation process 6C of the Product Handler Module 6 may determine the general contour of the dress (e.g., removing the head and neck of the human model), may then add the estimated contour lines that are missing (e.g., the top shoulder line, and the right-side dress contour line). The Shape In-painting process 6D may then fill-in those areas with the suitable color(s) or texture(s) based on the nearby colors or textures; thereby generating (shown on the left side) a product mask that is useful for further virtual fitting, with curing of the previously-obstructed product regions.

In the above example, the filling-in process may be achieved, for example, by ensuring that each pixel that is missing or modified, is completed by taking into account the information from at least two (or at least three, or at least four, or at least N) neighboring pixels.

In the above example, the Shape estimation process 6C may utilize multiple images of the same product, as well as machine learning, in order to complete the hidden or obstructed product regions. For example, some online vendors provide multiple images of the same product, from different angles, or with different models, or with a single model that appears at different positions (e.g., front view, side view). In some embodiments, the Products Web Crawler Module 12 may obtain all such images, and the Shape estimation process 6C may utilize multiple images of the same product, in order to deduce the location and/or the features (e.g., colors, texture) of an area that is obstructed or hidden in the front-view image of the product. Optionally, the Shape estimation process 6C may search for a repeating pattern (e.g., dove-tail pattern, zigzag pattern, chess-board pattern, zebra pattern, circles pattern, polygonal patterns, lines pattern) in the product, and may attempt to complete the hidden region by further repeating a detected pattern. In some embodiments, adaptive extrapolation may be used, utilizing regional hash tables.

The Product Handler Module 6 may divide or isolate between two or more clothes items that appear to exist within a single product image that is intended to correspond to a single product. For example, the Products Web Crawler Module 12 may obtain an image that corresponds to meta-data or textual description of "shirt," whereas the actual product image depicts a human model that wears a shirt and also pants. Based on contextual analysis, and/or based on meta-data analysis or classification analysis, the Product extraction process 6A may determine that it is required to isolate only the shirt image from the product image, and to discard from that image not only the human model, and not only the background image (if any), but also to discard the pants image-data from that product image. A suitable grab-cut algorithm may be applied, by utilizing the textual or contextual analysis results, to isolate only the shirt image, and to discard the pants image-portion and the other elements.

The Product Handler Module 4, and particularly the Perspective and shape correction process 6E, may further cure or modify a particular type of distortion that may occur due to angular perspective of imaging as well as the three-dimensional structure of the human body, as opposed to the generally-flat two-dimensional appearance of a shirt which is merely laid-down on a table for photography. The Features and classification process 6B may detect a non-curved, or a generally-linear, contour line of a product image, and may classify such product image as requiring modification. Classification may also be performed by checking points-of-interest in the product. Once a linear or non-curved contour line is detected, an emulation or simulation may be performed by the Perspective and shape correction process 6E, modifying the angular perspective of imaging to create curved contour lines. For example, the angular perspective of the product image may be modified from a full-frontal perspective to an angular perspective as if the product is imaged from chest-level or neck-level.

Figure 20:
FIG. 20 is a 2D product image that has been obtained from a vendor source.
Figure 21:
FIG. 21 is a composite anchor image that incorporates the 2D product image of FIG. 20 virtually dressed on an anthropomorphic entity.
Figure 22:
FIG. 22 is a composite anchor image that incorporates an anthropomorphic model virtually dressed using a 2D product image that has been enhanced to add 3D effects using certain image processing that may be performed in accordance with the present disclosure.
Figure 23:
FIG. 23 is a composite anchor image that incorporates an anthropomorphic model virtually dressed using a 2D product image that has been enhanced to add 3D effects using certain image processing that may be performed in accordance with the present disclosure.

FIG. 20 depicts a less-realistic product image in which the lower edge of a shirt is generally straight or generally linear or generally non-curved. As can be seen in FIG. 21, using this image for virtual dressing results in non-realistic appearance. In contrast, FIGS. 22 and 23 depict more-realistic product images in which the lower edge of a shirt is generally non-straight or generally non-linear or generally curved.

Figure 26:
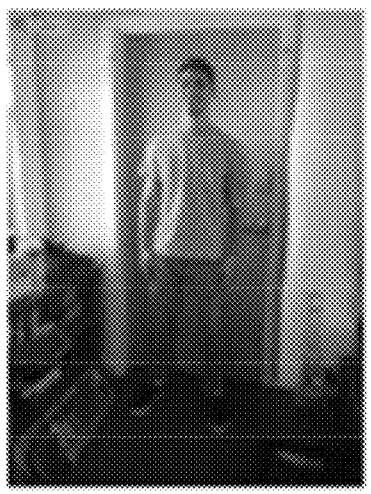
FIG. 26 is a user image.
Figure 27:
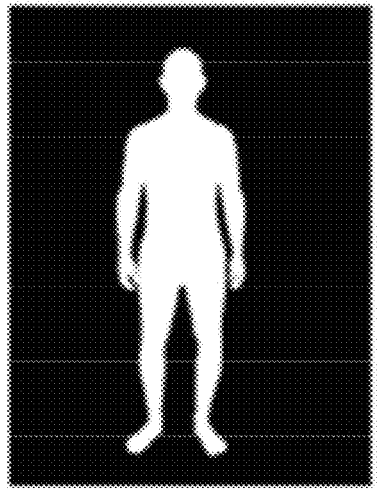
FIG. 27 is a user mask corresponding to the user image of FIG. 26 resulting from certain image processing that may be performed in accordance with the present disclosure.
Figure 28:
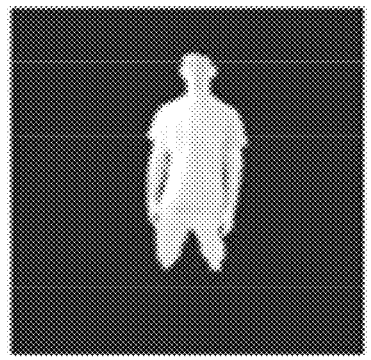
FIG. 28 is a lighting map corresponding to the user image of FIG. 26 resulting from certain image processing that may be performed in accordance with the present disclosure.

The Universal Dressing Module 8 of the system 2 performs the actual fusion or combining of overlay or insertion or assembly or construction, of the product image and the user image. As shown in FIG. 4, the Universal Dressing Module 8 may receive as its input 30, one or more product images (optionally with points-of-interest locations identifiers) and one or more corresponding product masks. FIG. 24 illustrates an example product image (a shirt) and FIG. 25 illustrates an example product mask for the product image of FIG. 24. The Universal Dressing Module 8 may further receive as its input 30, the user image (optionally with points-of-interest locations identifiers) and a corresponding user mask, and optionally also a lighting map of the user. FIG. 26 illustrates an example user image. FIG. 27 illustrates and example mask for the user image of FIG. 26. FIG. 28 illustrates an example lighting map for the user image of FIG. 26.

The Universal Dressing Module 8 may ensure that the product image fits accurately when overlayed over the user image, optionally by resizing the product image (or product mask) and/or the user image (or user mask). These operations may be performed by the Product size estimation process 8A and the Estimate product shape on the user according to user figure and fabric type process 8B. Optionally, the Estimate product shape on the user according to real world gravitation process 8C may modify the appearance of the product when overlayed onto the user's image or mask, by simulating the effect of gravity on certain regions of the product; such as, by modifying sleeves to "drop down" or to have slightly lower edges, thereby creating a more-realistic combined image. The process 8C may take into account how gravity is estimated to affect each particular region or portion of the product, and not just the entirety of the product; but without obstructing the actual characteristics (e.g., patterning) of the product. For example, the process 8C may estimate the effect of gravity on whether a shirt would, or would not, be immediately adjacent to a body part, or be spaced apart from it (e.g., vertically, diagonally, or the like), and may estimate how "form fitting" or non-form-fitting each region of the product is (e.g., sleeve, upper sleeve area, lower sleeve area, shoulders area, torso area).

Figure 29:
FIG. 29 is a user image that has been modified to add a gravitational effect using certain image processing that may be performed in accordance with the present disclosure.
Figure 30:
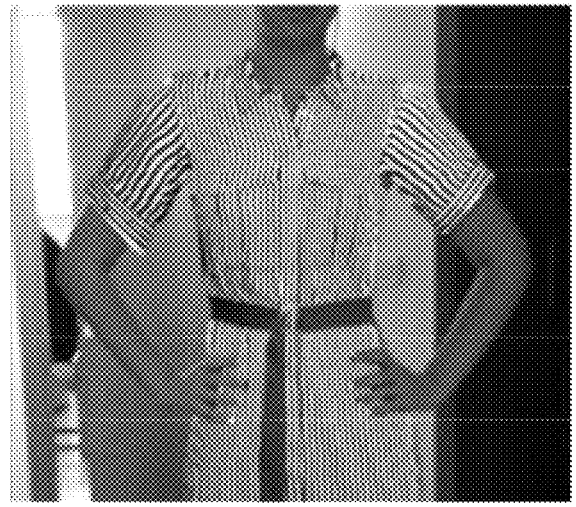
FIG. 30 is a user image that has been modified to add a gravitational effect using certain image processing that may be performed in accordance with the present disclosure.

In some embodiments, the process 8C may take into account the particular shape of the product being processed; for example, some shirts may have a short-sleeve that opens up like a bell shape, and therefore tends to drop down due to gravity. This is illustrated in FIG. 29. Other shirts may have a short-sleeve that is tubular or elongated or pipe-shaped, thereby appearing to cling better to the arm and to have a reduced drop-down due to gravity. This is illustrated in FIG. 30.

After performing separate estimations of gravity effect for each such discrete area or region, the process 8C may proceed to ensure that the transition from one area to the next area is smooth and/or gradual, and that the depiction avoids or cures or modifies any sudden "jumps" or "steps" between portions (e.g., between upper sleeve area, which is form-fitting, and lower sleeve area which may be dropped-down due to gravity).

Optionally, the Light extrapolation for the dressed product process 8D and the Shadow estimation for the dressed product process 8E may generate and insert shading effects, at selected places of the combined image, to make the combined image appear more realistic. The processes 8D and 8E may take into account, for example, the gravity effects as calculated, the level of dinginess of the product to the user's body, the lighting map that is associated with the user's image or user's mask, the existence (or the addition) of wrinkles or folded portions (which may thus cast a slight shade nearby), the position of the arms (or other body parts of the user), and/or other suitable parameters.

In some embodiments, the Features and classification process 6B of the Product Handler Module 6 may utilize the product image, the product mask, and data or meta-data about the product (e.g., as extracted or obtained by the Products Web Crawler Module 10), may may extract product characteristics and points-of-interest, may perform classification of the product; and may further generate tags or meta-data or classifiers about the product or its characteristics (e.g., has a collar; has long sleeves; has buttons; has shoulder-straps; generally symmetric product; generally a-symmetric product) which may subsequently be utilized to improve the virtual dressing process. The classification, classifiers, tags and/or other characteristics may be utilized for creation of a training database, which may be utilized by the Products Web Crawler Module 10 in order to efficiently and accurately absorb new products into the system 2. For example, insights or techniques that were already extracted with regard to a dress that has a dollar and buttons and long sleeves may later be applied or re-used when a new product is absorbed or imported into the system 2 and its meta-data (or its initial image processing analysis) indicates that it is, similarly, such a particular dress. This may allow efficient and accurate absorption of new products, even if little or no meta-data exists about them.

In some embodiments, the Products Web Crawler Module 10 may crawl the web, by using discover techniques and/or re-visit techniques, and may import, download and/or extract images of products, as well as data, meta-data, descriptors, and/or other product information (e.g., price, vendor, maker, model name, model number, or the like). Textual analysis and/or contextual analysis may be used, to extract available product sizes, product dimensions, available destinations for shipping, or the like. Pairs of key/value items may be extracted and analyzed (e.g., "Size"/"Medium"). Optionally, textual analysis and rule-based learning techniques may be used, as well as extraction and mapping of HTML tags, and prioritizing them based on level of relevancy or importance for the purpose of virtual dressing, and/or prioritizing them or ordering them by taking into account on-screen location and/or font size and/or font characteristics (e.g., a larger, bold font, may be associated with information of greater priority or greater relevance). Optionally, higher-priority elements may be processed or analyzed before lower-priority elements, in order to ensure that the system resources are utilized efficiently.

In some embodiments, the User Handler Module 4 of the system 2, via its Figure estimation process 4D, may utilize one or more algorithms to determine or estimate real-life dimensions of a user, or of particular body parts or body regions of a user, based on one or more images of the user.

A first demonstrative algorithm that may be implemented by the Figure estimation process 4D estimates or determines the hips circumference of the user. The algorithm utilizes one or more of the following data, which may be generated by the system 2 and/or may be extracted from an image of the user: the Mask image of the user; the point in which the two legs of the user connect to each other (p); the central points of the two knees (lk, rk); the external or most-external points of the left hip and the right hip (lh, rh); the head point, such as the highest point of the forehead (fh); a point in the ground or floor on which the user is standing, such as the floor point that is closes to the user (f); the height of the user (H). Some or all of these parameters may be extracted from the user image by the User extraction process 4B of the User Handler Module 4, optionally after the Image enhancement and perspective correction process 4A removes possible image distortion due to an original angular perspective, thereby enabling a constant conversion ratio all across the image between pixel-based dimensions and on-screen centimeter-based (or inches-based) dimensions. The constant conversion ratio may be obtained by dividing the height of the user in pixels, by the height of the user in centimeters (or inches), and this constant ratio may be used further in this algorithm.

Figure 31:
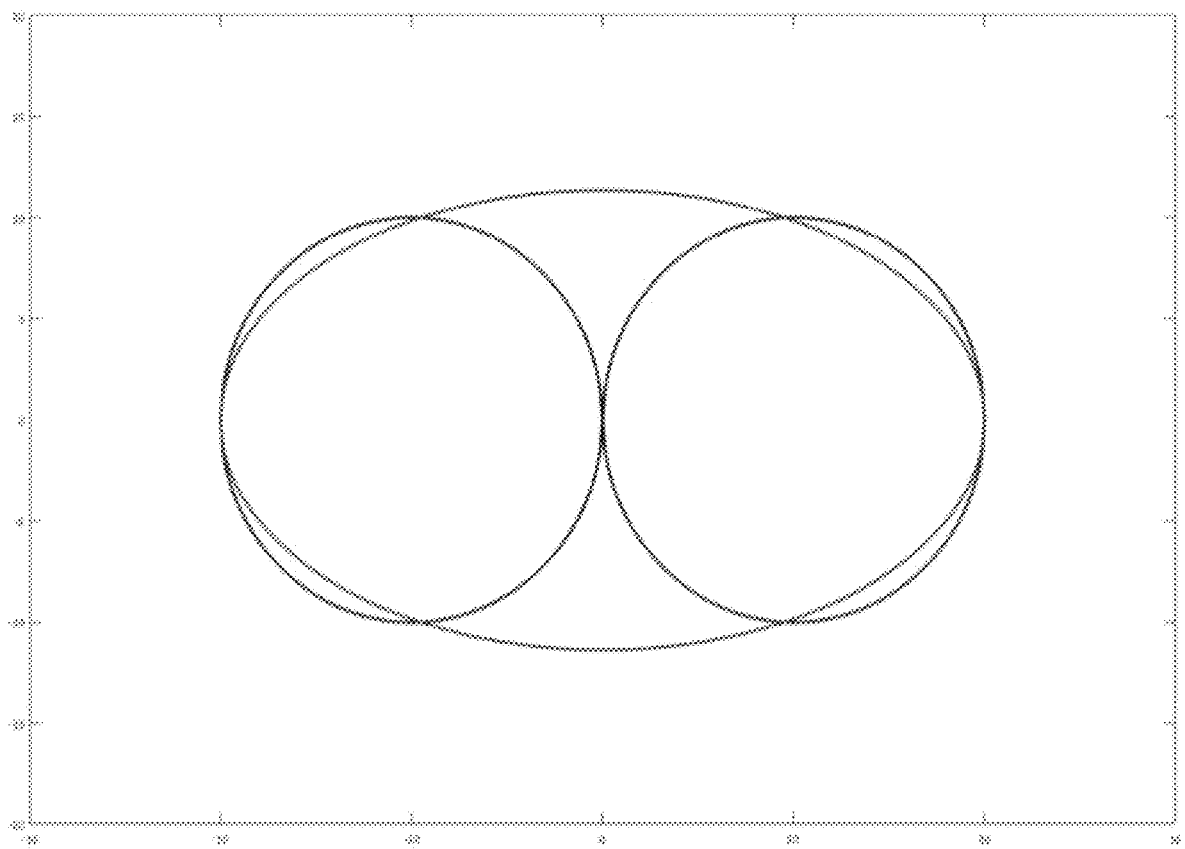
FIG. 31 is a schematic diagram showing geometric parameters that may be used to determine a user's hip circumference using certain image processing that may be performed in accordance with the present disclosure.

The estimation or calculation of hips circumference of the user may take into account the following: (a) that the cross-section of the leg, in the region of connection of the leg to the pelvic area, is generally circular; (b) that the cross-section of the region that is subject of the estimation, namely the two hips cross-section, is generally elliptic or generally oval; (c) that the sum of two cross-sections of the two legs, at the point of the legs connection, is generally similar to the area of the subject of estimation, namely the area of the two hips cross-section; (d) that the two generally-circular areas, of the two cross-sections of the legs at the legs connection point, are generally tangent to each other or are just touching each other, with little or with no overlap between the two circular areas; and/or (e) that the generally-elliptic area of the two hips, is generally tangent or just touching the two circles of the legs cross-section, at two points that are furthest from the touching point of the two circles themselves. These parameters illustrated in the schematic diagram of FIG. 31.

By using a user image mask (such as that shown in FIG. 27), the point of legs connection (p), and the external points of the hips (lh, rh), the User extraction process 4B computes the radius of each one of the circular cross-sections, and thus computes the areas of those two circular cross-sections. The sum of the two circular areas, is identical or is similar to the area of the ellipse which corresponds to the two hips area. The ellipse is described by the equation: $x^2/a^2 + y^2/b^2 = 1$. The value of "a" is computed as twice the radius of one circle. Based on the above equation and data, and since the area of the ellipse is known (as the sum of the areas of the two circles), the value of "b" can be computed. Based on the values of "a" and "b", the circumference of the ellipse is computed, which in turn corresponds to the estimated hips circumference.

In some embodiments, the Figure estimation process 4D may estimate or determine the waist circumference of a user, based on an image of the user. The process may utilize some or all of the following: a user image mask (such as that shown in FIG. 27), optionally after removing from it angular perspective; the point of height of the waist (w), after removal of perspective; the hips circumference (HC) as computed above; the "b" parameter of the ellipse as computed above; the constant conversion ratio (e.g., pixel-to-centimeter conversion), as computed above; the user height (denoted H or UH). Based on the user image mask, and the point of height of the waist (w), the waist diameter (or the waist width) is computed (WD), in pixels, and is then converted to centimeters by using the constant conversion ratio. The waist circumference (WC) may then be computed by using the following equation:

$$WC = 2 \cdot WD + (HC/UH)^\alpha \cdot WD + (HC/UH)^\beta \cdot b$$

The parameters "α" and "β" control the trade-off between the two elements: WD and b, respectively. Assuming that the values of HC/UH are lower than 1 (as this s probably the case for almost all people), when a is decreasing; the dependence of WC on WD is increasing. When β is decreasing, the dependence of WD on the parameter b is increasing. The values of α and β may be established, for example, by analyzing data of actual waist circumferences of a large number of persons (e.g., over 100 or over 1,000 persons).

In some embodiments, the Figure estimation process 4D may estimate or determine the bust circumference, or the circumference of the chest area of a user, based on a user's image. The process may utilize some of the above-mentioned parameters and data, as well as the external or most-external points of the bust (lb, rb) after removal of angular perspective. Based on a user image mask (such as that shown in FIG. 27), and the external points of the bust (lb, rb), the bust diameter (or bust width) is computed (BD), and converted from pixels to centimeters via the constant conversion ratio. The bust circumference (BC) may be computed by using the following equation:

$$BC = 2 \cdot BD + (HC/UH)^\gamma \cdot BD - (HC/UH)^\delta \cdot WD$$

The parameters "γ" and "δ" control he trade-off between the two elements: BD and WD respectively. Assuming that the values of HC/UH are lower than 1, when γ is decreasing, the dependence of BC on BD is increasing. When δ is decreasing, the dependence of BC on WD is increasing. The values of gamma and delta may be established, for example, by analyzing data of actual bust circumferences of a large number of persons (e.g., over 100 or over 1,000 persons).

In some embodiments, the User extraction process 4B may estimate or detect the cup size of a user, particularly of a female user, based on the image of the user and/or based on one or more of the parameters or data that were obtained or computed above. For example, the cup size may be estimated based on a ratio between the waist circumference (WC) and the hips circumference (HC) of the user. In a demonstrative embodiment, the following determinations or conditions may be used: if WC/HC is smaller than or equal to a first pre-defined ratio R1, then the cup size is "B"; if WC/HC is greater than R1, and is smaller than or equal to R2, then the cup size is "C"; if WC/HC is greater than R2, then the cup size is "D". In a demonstrative implementation, R1 is 0.71, and R2 is 0.78. Other suitable ratio values and/or conditions may be used.

In some embodiments, the Universal Dressing Module 8, via its Estimate product shape on the user according to real world gravitation process 8C, may utilize the following algorithm for gravitational simulation of dressing.

Demonstrative Algorithm for Gravitational Simulation of Dressing

Figure 32:
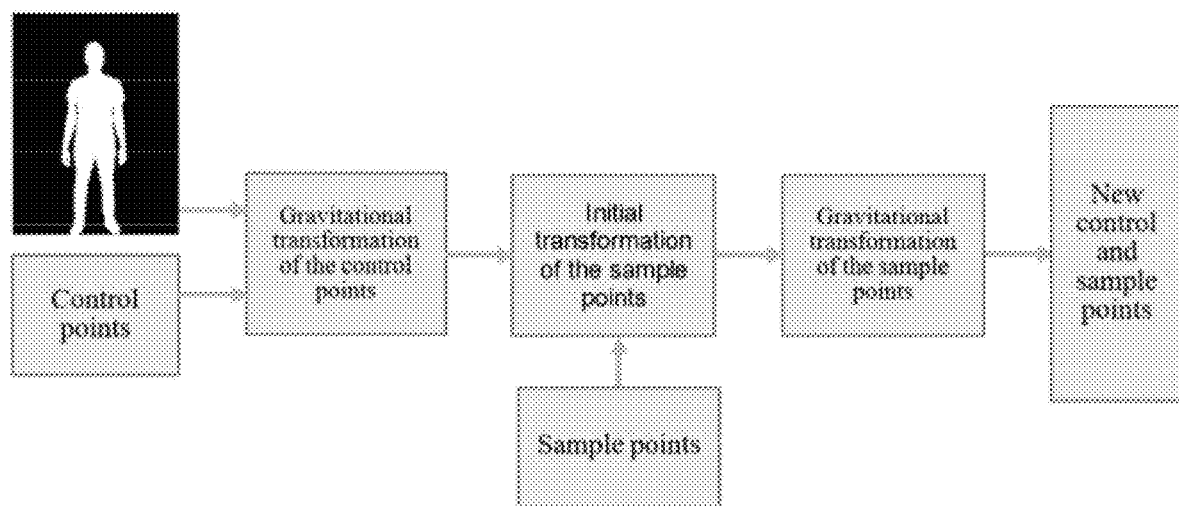
FIG. 32 is a block diagram showing an example gravitation effects algorithm using certain image processing that may be performed in accordance with the present disclosure.

This example algorithm may be used to transform the control and the sample points of clothing (shirt and pants) for dressing according to the gravitational forces that are acting on the cloth. The algorithm is transforming various control and the sample points of both the shirts and pants. It is considering all the gravitational forces that are acting on all parts of the user's body as a function of the user's posture. In the ensuing discussion, reference may be had to FIG. 32, which schematically illustrates the below-described functions and algorithms.

Functions and Algorithms:

1. Gravitational Transformation of the Control Points

This algorithm is transforming the dress' control points according to the gravitational forces.

This algorithm is using the following data:
The dress' control points.
The user's mask.

Demonstrative Description of the Algorithm's Operation:
The algorithm is calculating the distance between each of the control points and the user's mask. The distance between a control point and the user's mask is defined as the distance between the control point and the point on the mask which is the closest to it.

The algorithm decides if the dress is a shirt or pants according to the set of control points in the input.

A. The dress is a shirt.

The shirt is divided into multiple parts; for example, three parts:

The part between the shoulder and the elbow (right arm and left arm). Hereafter part 1.

The part between the elbow and the wrist (right arm and left arm). Hereafter part 2.

The part between the arm pit and the hips. Hereafter part 3.

The algorithm is calculating the angle of each part of the shirt with respect to the ground.

The left and the right shoulder points are transformed to the closest point on the mask.

The left and the right armpit points are not being transformed.

On the arms, each outer point is transformed so that its new distance from the mask will be:

$$l' = l \cdot \sin$$

Where l' is the new distance between the point and the mask, l is the initial distance between the point and the mask, and α is the angle between the relevant part of the arm and the ground. For the elbow points, the relevant part on the arm is part 1, for the wrist points the relevant part is part 2.

The inner points on the arm are transformed so that their new distance from the mask will be:

$$k' = k + l - l \cdot \sin(\alpha)$$

Where k' is the new distance between the point and the mask, k is the initial distance between the point and the mask, l is the initial distance between the corresponding outer point and the mask, and a is the angle between the relevant part of the arm and the ground.

The algorithm is transforming the control points on part 3 of the shirt.

The algorithm decides which of the left and right hips points is farther from the ground according to the angle of part 3. The algorithm then transforms the farther hips point so its distance from the mask will be:

$$m' = m \cdot \sin(\beta)$$

Where m' is the new distance of the point from the mask, m is the initial distance of the point from the mask, and β is the angle between part 3 and the ground. The hips point that is closer to the ground is transformed so that its distance from the ground will be:

$$n' = n + m - m \cdot \sin(\beta)$$

Where n' is the new distance of that hips point from the mask, n is the initial distance of this point from the mask, m is the initial distance of the farther hips point from the ground, and β is the angle between part 3 and the ground.

B. The dress is pants.

The pants are divided into 2 parts:

The part between the hips and the knee (right leg and left leg). Hereafter part 4.

The part between the knee and the ankle (right and left legs). Hereafter part 5.

The algorithm is calculating the angle of each part of the pants with respect to the ground.

The left and the right hips points are transformed to the closest point on the mask.

The left and the right middle leg points are not being transformed.

Each outer point on the legs is transformed so its distance from the mask is:

$$p' = p \cdot \sin(\gamma)$$

Where p' is the new distance between the point and the mask, p is the initial distance between the point and the mask, and γ is the angle between the relevant part of the leg and the ground. For the knee points, the relevant part is part 4 and for the ankle points the relevant part is part 5.

The inner points on the legs are transformed so that their distance from the mask will be:

$$q' = q + p - p \cdot \sin(\gamma)$$

Where q' is the new distance between the point and the mask, q is the initial distance between the point and the mask, p is the initial distance between the corresponding outer point and the mask, and γ is the angle between the relevant part of the leg and the ground.

2. Initial Transformation of the Sample Points

This algorithm is transforming the dress' sample points according to the transformation of the control points.

The algorithm is using the following data:
The dress' initial control points (before the transformation).
The dress' new control points.
The sample points.
The user's mask.

Demonstrative Description of the Algorithm Operation:
The algorithm first calculates an equation of a straight line (initial line) between each couple of initial control points of each part (inner and outer).

The algorithm is calculating the distance between each sample point and the relevant initial line.

The algorithm is calculating an equation of a straight line (new line) between each two new control points of each part (inner and outer).

The algorithm is transforming each sample point to a new position that uphold the conditions:

Its distance from the relevant new line is the same as its initial distance from the relevant initial line.

In the initial position of the sample point, the algorithm is finding the point on the initial line which is closest to it. Then it calculates the distance between the point on the line and the left edge of the initial line. We denote this distance by d1. The definition of d2 is the same as d1 but for the new position of the sample point and the new line. Then the algorithm calculates the length of the initial line (l1) and the length of the new line (l2). Then the condition is:

$$d1/d2=l1/l2$$

3. Gravitational Transformation of the Sample Points

This algorithm transforms the sample points according to the gravitational forces that are acting on the dress.

The algorithm is using the following data:
The dress' sample points.
The user's mask.
The angles of parts 1-5.

Demonstrative Description of the Algorithm Operation:
Each sample point is related to a specific part of the body (parts 1-2 left arm or right arm, inner or outer, part 4 left or right, and part 5 left leg or right leg, inner or outer).

The inner sample points (parts 1, 2, and 5) and the hips point that is closest to the ground are not being transformed.

The algorithm is calculating the distance of all the other sample points from the user's mask.

Each of these sample points is transformed so that its new distance from the mask will be the current distance times the sine of the angle of the relevant part.

In some embodiments, the User Handler Module 4 (via its Body completion process 4F), and/or the Product Handler Module 6 (via its Perspective and shape correction process 6E), and/or the Universal Dressing Module 8 (via its Shadow estimation for the dressed product process 8E), may utilize an algorithm for removal, modification, reduction and/or adding of shades or shading or shadows from an image of a user and/or from and image of a product and/or from a combined image of user-and-product.

Figure 33:
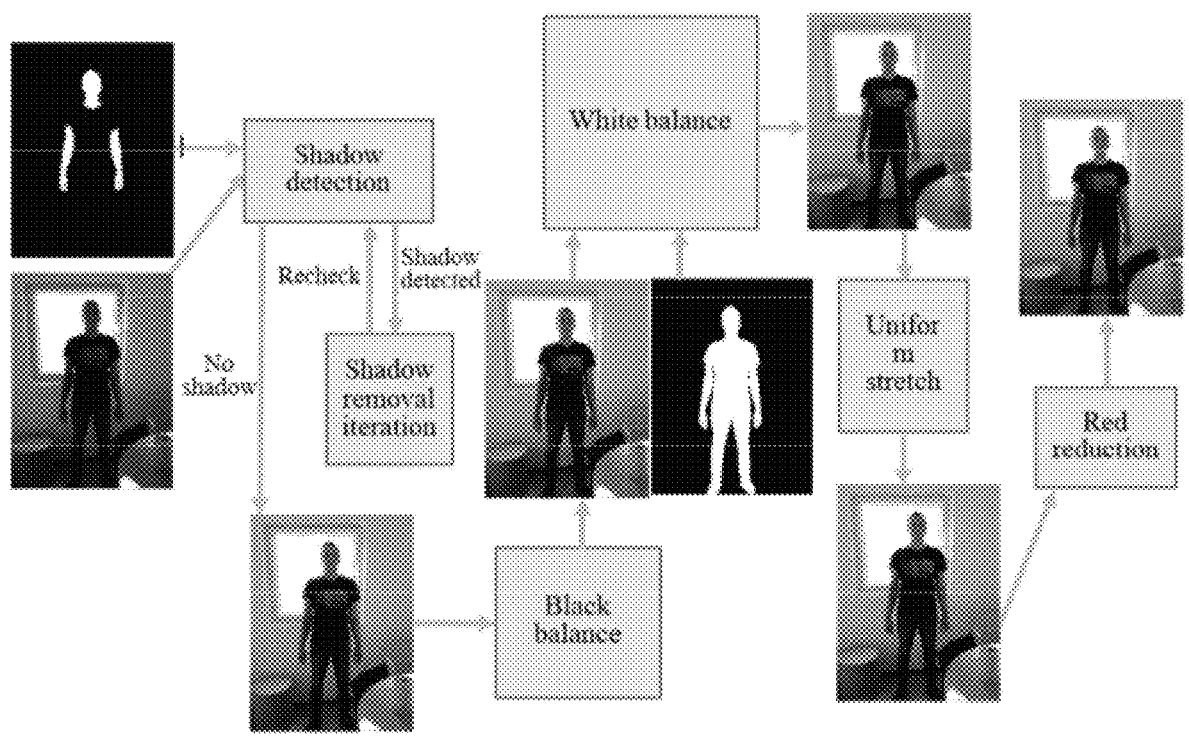
FIG. 33 is a block diagram showing example user image enhancement using certain image processing that may be performed in accordance with the present disclosure.

Demonstrative Algorithm for a Removal/Reduction/Modifications of Shadows (e.g., from Users Images) and an Improvement of the Quality of the Image This algorithm detects a shadow on a user and removes it, balance the colors in the image, brightens the image, and reduces red color from the user's skin if necessary. In the ensuing discussion, reference may be had to FIG. 33, which schematically illustrates the below-described functions and algorithms.

Functions and Algorithms:

1. Shadow Detection

This function checks detects a shadow on the user. The function's decision is based on the face of the user.

The function is using the following data:
The original image.
The seen body mask.

Description of the Algorithm Operation:
The function is using "Viola-Jones Algorithm" for face detection. Then the seen body mask is cut down from the lower part of the face box. The seen body mask is now a face mask.

The function is using "Viola-Jones Algorithm" for eyes detection. The function splits the face mask to right and left according to the horizontal center between the left and the right eyes of the user. The function now has the user's left face mask and right face mask.

The function is using the left and the right face masks to calculate the median value of the luminance of both sides of the face, as well as the standard deviation value of the luminance of both sides of the face. Then the function checks the following conditions:

If the difference in the median of the luminance between the left and the right sides of the user's face is higher than 80 AND the amount of pixels with luminance of 255 in the left side of the face is less than 5 AND the amount of pixels with luminance of 255 in the right side of the face is less than 5 then the function returns true for shadow.

If the standard deviation of the luminance of both the left and the right sides of the face is higher than 32, then the function returns false for shadow.

If the median of the luminance of both the left and the right sides of the face is higher than 90, then the function returns false for shadow.

In any other case the function returns true for shadow.

2. Background Flash Detection

This function checks if there is a certain amount of bright pixels in the background (outside the user's body) of the image.

The function is using the following data:
The original image.
The user's mask that is composed from the shirt mask, the pants mask, and the seen body mask.

Description of the Algorithm Operation:
The algorithm counts the number of pixels of luminance: 252, 253, 254, and 255, here denoted as n(252), n(253), etc. The function returns true for background flash if the following condition is true:

$$4\cdot[0.1\cdot n(252)+0.15\cdot n(253)+0.2\cdot n(254)+0.6\cdot n(255)]/N\geq 0.01$$

Where N is the total number of pixels in the image.

3. Shadow Removal Algorithm

This algorithm removes a small amount of shade from the image in each iteration until the shadow detection function does not detect a shadow.

The algorithm is using the following data:
The original image.
The seen body mask.

Description of the Algorithm Operation:
This algorithm operates in iterations. The two conditions two enter an iteration are:
  a. The shadow detection function detects a shadow.
  b. The fraction of pixels with a red value of 255 on the face of the user is less than 0.007.

The algorithm is working in the luminance space of the image. It is using a pre-defined function that describes the output luminance of the image as a function of its input luminance. In each iteration this function is applied to the image. The more iterations, the more brightened the image will be.

4. Black Balance Algorithm

This algorithm is stretching down the luminance of each of the three color channels: red, green, and blue down to zero.

The algorithm is using the following data:
The image after the shadow removal algorithm.

Description of the Algorithm Operation:
The algorithm is calculating the mean luminance of each of the three color channels: red, green, and blue. Hereafter, the channels with highest, second highest, and lowest luminance are called: first channel, second channel, and third channel respectively.

The algorithm maps the pixels of the image in terms of color domination. I.e. the dominant color of a pixel is the one with the highest luminance.

The algorithm maps the pixels of the image in terms of color domination, i.e., the dominant color of a pixel is the one with the highest luminance.

The algorithm stretches the third channel so that 5% of the pixels in this channel will have a luminance value of 0

(a stretch is not being performed in the case where there are already 5% or more pixels in this channel with a luminance value of 0).

The algorithm is stretching the second channel. The algorithm is stretching this channel as much as possible, under two conditions:
  a. The mean luminance of the second channel does not become lower than the mean luminance of the third channel.
  b. In pixels where the third channel had originally lower luminance than the second channel, after this stretch, the third channel must have a lower luminance than the second channel.

The algorithm is stretching the first channel. The algorithm is stretching the channel as much as possible under two conditions:
  a. The mean luminance of the first channel does not become lower than the mean luminance of the second channel.
  b. The order of color domination in each pixel after the stretch must remain as it was in the original image.

5. White Balance Algorithm

This algorithm is stretching up the three color channels of the image: red, green, and blue.

This algorithm is using the following data:
The image after the black balance algorithm.
The user's mask.
The seen body mask.

Description of the Algorithm Operation:

The algorithm is calculating the mean luminance of the three color channels: red, green, and blue.

The algorithm is mapping the pixels of the image in terms of color domination. i.e., the dominant color of a pixel is the one with the highest luminance.

The algorithm is stretching the luminance of the first channel up until one of the following conditions met:
  a. 5% of the pixels in the background have a luminance of 255 in the first channel.
  b. There are pixel on the user's mask that have luminance of 255 in the first channel.

The second channel is stretched up as much as possible under the following conditions:
  a. The mean luminance of the second channel does not exceed the mean luminance of the first channel.
  b. For pixels with a total luminance higher than 40 where the first channel had ORIGINALLY higher luminance than the second channel; after the stretch, in no more than a fraction of 0.04 of these pixels, the first and the second channels can change orders in terms of luminance magnitude.
  c. For pixels on the user's skin, with a total luminance higher than 40 where the first channel had ORIGINALLY higher luminance than the second channel; after the stretch, in no more than a fraction of 0.01 of these pixels, the first and the second channels can change orders in terms of luminance magnitude.

The third channel is stretched up as much as possible under the following conditions:
  a. The mean luminance of the third channel does not exceed the mean luminance of the second channel.
  b. For pixels with a total luminance higher than 40 where the second channel had originally higher luminance than the third channel; after the stretch, in no more than a fraction of 0.08 of these pixels, the second and the third channels can change orders in terms of luminance magnitude.
  c. For pixels with a total luminance higher than 40 where the first channel had originally higher luminance than the third channel; after the stretch, in no more than a fraction of 0.08 of these pixels, the first and the third channels can change orders in terms of luminance magnitude.
  d. For pixels on the user's skin, with a total luminance higher than 40 where the second channel had originally higher luminance than the third channel, after the stretch, in no more than a fraction of 0.09 of these pixels the second and the third channels can change orders in terms of luminance magnitude.
  e. For pixels on the user's skin, with a total luminance higher than 40 where the first channel had originally higher luminance than the third channel, after the stretch, in no more than a fraction of 0.07 of these pixels, the first and the third channels can change orders in terms of luminance magnitude.

6. Uniform Stretch Algorithm

This algorithm is stretching up uniformly the three color channels of the image.

The algorithm is using the following data:
The original image.
The image after the white balance algorithm (color balanced image).
The user's mask.
The seen body mask.
The face mask.

Description of the Algorithm Operation:

The algorithm is stretching up the total luminance of the color balanced image under several conditions. The conditions depend on the result of the background flash detection function and on whether the shadow removal algorithm was applied to the image at least once.

A. The background flash detection function returns true and the shadow removal algorithm was applied. Here the term "new pixels" refers to pixels whose luminance in the original image was less than 255. The conditions to stop the stretching in this case are:
    The amount of new pixels with a luminance value of 255 in the image is not allowed to exceed a fraction of 0.03 of the total amount of pixels in the image.
    The amount of new pixels with a red channel value of 255 in the image is not allowed to exceed a fraction of 0.05 of the total amount of pixels in the image.
    The amount of new pixels with a luminance value of 255 on the user's body is not allowed to exceed a fraction of 0.02 of the total amount of pixels on the user's body.
    No more than a fraction of 0.005 of the pixels on the face are allowed to have a luminance value of 255.
  B. The conditions to stop the stretching in the case where the background flash detection function returns false OR the shadow removal algorithm was not applied to the image:
    No more than a fraction of 0.04 of the pixels in the image are allowed to have a luminance value of 255.
    No more than a fraction of 0.06 of the pixels in the image are allowed to have a red channel value of 255.
    No more than a fraction of 0.05 of the pixels on the user's body are allowed to have a luminance value of 255.
    No more than a fraction of 0.005 of the pixels on the user's face are allowed to have a luminance value of 255.

The algorithm also returns the stretch factor for the case where only the first condition was applied in both A. and B.

7. Red Skin Reduction Algorithm

This algorithm reduces the amount of red on the user's skin if necessary.

The algorithm is using the following data:
The image after the uniform stretch algorithm (uniformly stretched image).
The original image.
The seen body mask.
The user's mask.

Description of the Algorithm Operation:
The algorithm first considers the difference between the medians of the red channel and the green channel on the user's skin both in the original image and in the uniformly stretched image. The algorithm sets a value to a variable called redSkin according to these differences:

The difference in the new image is higher or equal to 100 and the difference in the original image is less than 100: redSkin=the difference in the new image times 0.8.

The difference in the new image is higher or equal to 80 and the difference in the original image is less than 80: redSkin=the difference in the new image times 0.9.

The difference in the new image is higher or equal to 70 and the difference in the original image is less than 70: redSkin=the difference in the new image times 0.92.

The difference in the new image is higher or equal to 60 and the difference in the original image is less than 60: redSkin=the difference in the new image times 0.94.

The difference in the new image is higher or equal to 50 and the difference in the original image is less than 50: redSkin=the difference in the new image times 0.96.

The difference in the new image is less than 50: redSkin=0

If redSkin is 0 then no more operations are applied to the image and the final results of the "removal of shadows from users and improvement of the quality of the image" algorithm is the uniformly stretched image.

If redSkin is more than 0, then the image is transformed from the RGB color space to the HSV space and the S channel is decreased until the difference between the red and the green channels is less than the value of redSkin. The image is transformed back to the RGB space and returned as the final result of the "removal of shadows from users and improvement of the quality of the image" algorithm.

In some embodiments, the Universal Dressing Module 8, via its Product size estimation process 8A, may utilize an algorithm for estimating clothing size based on user measurements and cloth properties, by employing a non-parametric machine learning approach. User measurements include the bust, hips and waist circumference and the user's height. Clothes properties include whether it is a stretchable material and a full size chart. The algorithm uses machine learning tools to learn a non-parametric model based on tens of thousands of past users' acquisitions. The algorithm has two parts:

1. Learning phase: learning from past experience a non-parametric model

2. Application phase: recommend the user the cloth size given the cloth's properties and the user's measurements.

Learning Phase

The algorithm may use machine learning with a supervised learning approach. The algorithm may utilize labeled examples. Each such example is denoted as a data point. Table 1 define the features that compose a data point.

TABLE 1

| Features in data point | |
|---|---|
| User height | in inches |
| Bust circumference | in inches |
| Hips circumference | in inches |
| Waist circumference | in inches |
| Is the cloth stretchable | True/False |
| Full size chart | Maps body measurements to sizes |
| Size bought by the user | One of the sizes from the full size table |

Figures 34, 35:
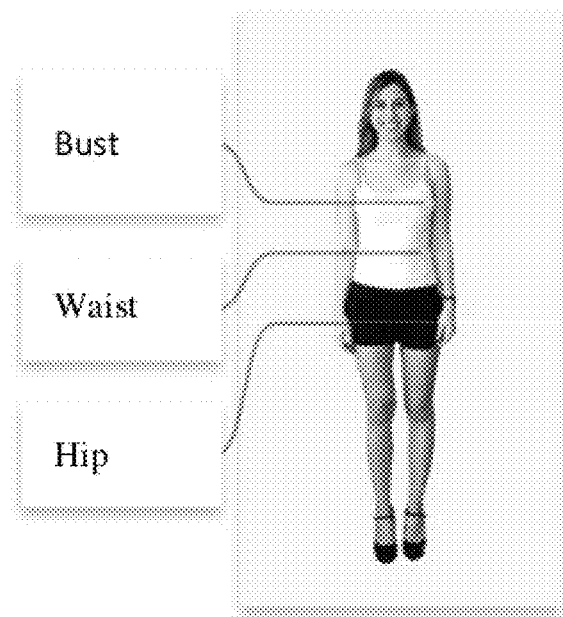
FIG. 34 is a user image showing measurements that may be used to determine a matching clothing size.
FIG. 35 is an example clothing size chart correlating dress size with body measurements.

FIG. 34 illustrates the features of Table 1. FIG. 35 illustrates an example size chart. To train the algorithm, the system 2 may harvest from the web tens of thousands of such data points. Some of the data points may contain errors and need to be cleansed.

Cleansing the Data

The system may encounter three types of erroneous data points:

1. Some of the data is missing: for example a user didn't provide the bust circumference. For this type of errors, the system may drop the data point (do not take it into account in the learning phase) because it is not reliable, and may harm the model more than help.

2. Some of the data is ill-formatted: the system may encounter mainly two issues:

2.1. Some of the data is given in the wrong units. In such case the system may transform it into the suitable units (e.g., from cm to inches).

2.2. For some users instead of the bust size, the user provide her bra size. In that case the system may use a mapping of the cup size to inches according to table 2 below and add the band size to come up with the bust size.

TABLE 2

| Cup size contribution to circumference to inches | | | | | | | | | | | |
|---|---|---|---|---|---|---|---|---|---|---|---|
| AA | A | B | C | D | E | F | G | H | I | J | K |
| 0 | 1 | 2 | 3 | 4 | 5 | 6 | 7 | 8 | 9 | 10 | 11 |

3. The data is non-standardized: this means that each data point is provided with respect to its own size chart. Actually, every clothes manufacturer may use its own chart. In order to learn a consistent model, the system may first transform all the data points to a single reference size chart.

GetProbabilityTable is the function that maps one size chart to another

Input:
Current clothes size chart: denoted CSC
Reference clothes size chart: denoted RSC
Output:
Probability mapping from the current clothes size chart to the reference's size chart. For example, if the user is '2' on CSC the output will provide the probability for 'S', 'M', 'XL' which are the sizes in the current size chart.

Algorithm:
i. Compute the $L_p$ norm (p is a parameter) between measurements in CSC to those in RSC:

$$L_p(SZ_{RSC}^j, SZ_{CSC}^k) = \sqrt[p]{\Sigma(SZ_{RSC}^j(i) - SZ_{CSC}^k(i))^p}$$

Where $SZ_{RSC}^j(i)$ is the $i^{th}$ feature of the $j^{th}$ size in RSC and $SZ_{CSC}^k(i)$ is the $i^{th}$ feature in the $k^{th}$ size in CSC. For example $SZ_{RSC}^j$ might be 'medium,' $SZ_{CSC}^k$ might be '2' and the ith feature might be the bra size in inches.

ii. Use a Gaussian Kernel to transform the distances to affinities:

$$G(SZ_{RSC}^j, SZ_{CSC}^k) = \exp\left(-\frac{L_p(SZ_{RSC}^j, SZ_{CSC}^k)}{2\sigma^2}\right)$$

Where $\sigma$ is a parameter.
iii. Normalize the affinities to a probability:

$$P(SZ_{RSC}^j, SZ_{CSC}^k) = \frac{G(SZ_{RSC}^j, SZ_{CSC}^k)}{\Sigma_k SZ_{CSC}^k}$$

Where $$\sum_k SZ_{CSC}^k$$

is the sum over all sizes in CSC.

Once the data is cleansed, the system may train the non-parametric model.

Training the Non-Parametric Model

The system 2 may train, for example, 54 different non-parametric model(s). The reference size chart contains 9 different sizes: 'xs', 's', 'm', 'l', 'xl', '1x', '2x', '3x' and '4x'. For each size the system 2 may train two models: one for stretchable and one for non-stretchable clothing. The system 2 may perform this for three types of clothing: tops, bottoms and dresses.

Figure 36:
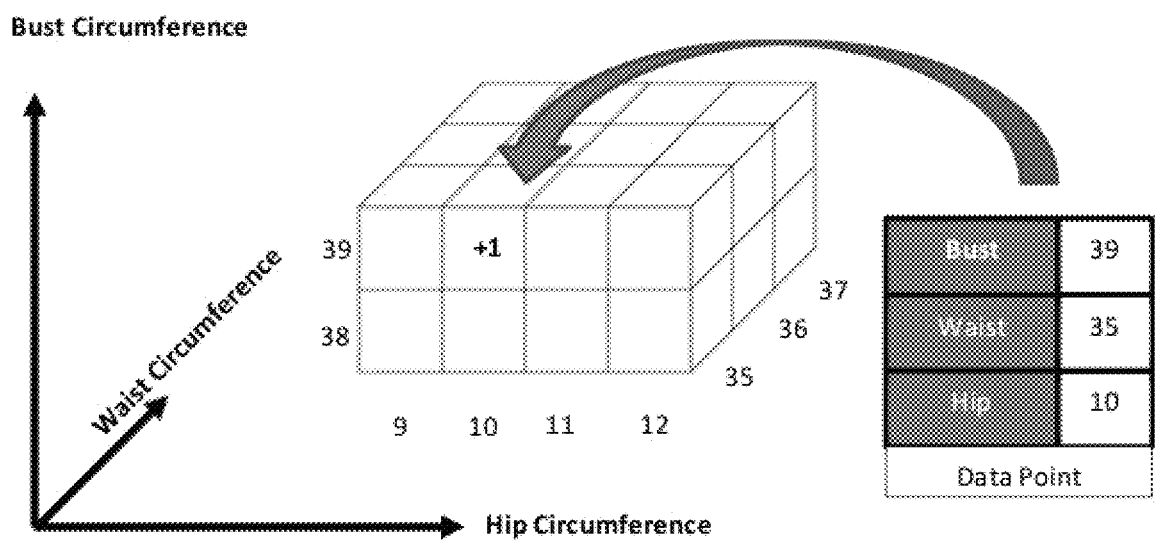
FIG. 36 is a 3D matrix representing a model for providing users with a recommended clothing size, and further showing a single body measurements data point that contributes to the model.

TrainModel is the Function that Performs the Training:
Input:
N cleansed data points: specified in Table 1. In practice the system 2 may use about 120,000 data points.
Output:
A non-parametric model, that given measurements and clothing properties returns the probability per size.
Algorithm:
1. dissect the data points according to cloth type: top, bottom and dress.
2. further bisect each group into stretchable vs. non-stretchable clothes.
3. Each data point contributes a count of 1 to the model into a bin that corresponds to the body measurements, as shown in FIG. 36. The left side of FIG. 36 depicts a 3D matrix representing the model. The right side of FIG. 36 depicts a single data point. The arrow points to the contribution of the data point to the model. For each clothing type, use a different set of features to identify the bin:

a. Tops: bust, hip and waist circumference
b. Bottoms: height and hip and waist circumference
c. Dress: height and bust, hip and waist circumference
4. Smooth each model with a multidimensional Gaussian kernel:

$$\frac{1}{\sqrt{(2\pi)^k |\Sigma|}} \exp\left(-\frac{1}{2}(x-\mu)^T \Sigma^{-1}(x-\mu)\right)$$

Where $\mu$ and $\Sigma$ are free parameters.
After training, the model is ready for its application phase.

Application Phase

The goal of the application phase is to use the models to provide the user with a recommended size. In addition, it may provide the user some comments regarding the recommendation. For example, it may recommend the user 'Medium' providing that it would be 'tight on the chest' or 'Large' which is going to be 'lose on the chest'.

To achieve this, the system may utilize two functions:
1. Estimate size: applies all the relevant model and come up with a probability per size for the specific cloth.
2. Evaluate comment: provides comments per cloth size.

Estimate Size
Input:
Size probabilities
User preference towards tight or lose (optional)
Output:
Comment on each size. Comments include 'lose', 'fit' or 'tight'.
Algorithm:
1. Per size find the most probable measure.
2. Take the user's measurements and measure the distance for the most probable measures. Assign 'fit' if the distance is bellow a threshold. If the distance is above threshold, assign 'lose' if the user measures are smaller than the most probable measure and 'tight' otherwise.

In some embodiments, the Universal Dressing Module 8, via its Product size estimation process 8A, may utilize a Product Size Adjustment process or algorithm. This algorithm is simulating the appearance of a garment on a user as a function of the size of the garment and the product size recommendation. The measurements algorithm is calculating the circumferences of the user at different areas on his body, as well as the cup size for women. The size estimation algorithm is using these results to recommend on a product size, and/or to correct or modify a product size that a user had suggested. Then, the product size adjustment algorithm is using the output of these algorithms, as well as the choice of garment size in order to simulate the appearance of the garment on the user.

Algorithm and functions
1. Size Check

The first operation of the algorithm is comparing the choice of garment size to the product size recommendations. If they are equal, then the algorithm is dressing the user with the default garment and pleats. The default garment is the one with the same size as the size recommendation and it is ready to be used.

2. Vertical Rescaling of the Garment

This algorithm is rescaling the default lengths of the garment according to the product size recommendations and the size chart of the garment. The size chart contains the dimensions of the garments for each of its possible sizes. If the garment's size chart does not exist, the algorithm is making use of a default size chart for the specific type of garment.

The algorithm may utilize the following data:
The product size recommendation.
The choice of garment size.
The default garment's image.
The garment's control points.
The user's control points.
The garment's size chart.
The default chart size.
Description of the Algorithm Operation:
The algorithm is vertically rescaling the default garment according to the product size recommendation, the choice of garments size, and the size chart.
The control points are rescaled accordingly.
3. Horizontal Rescaling of the Garment
The horizontal rescaling of the garment is done by transforming the control points of the garment or the user horizontally.
The algorithm may use the following data:
The product size recommendation.
The choice of garment size.
The image of the garment.
The garment's control points.
The user's control points.
The garment's size chart.
Description of the Algorithm Operation:
If the garment's size is smaller than the product size recommendation, then the algorithm is transforming the user's control points horizontally towards the user's mask. The translation of the control points depends on the product size recommendation, the choice of garment size, and the size chart.
If the garment's size is larger than the product size recommendation, then the algorithm is horizontally transforming each pair of the garment's control points (points on the same area of the body: elbow, wrist, etc. from both of its sides) towards each other.
4. Bust Rescaling for Women
This algorithm is rescaling the bust area of women's garments.
The algorithm may use the following data:
The user's bust circumference.
The user's cup size.
The choice of garment size.
The image of the garment.
The garment's size chart.
Description of the Algorithm Operation:
If the choice of garment size is smaller than the product size recommendation, then the under bust area on the garment becomes more tight.
If the choice of garment size is larger than the product size recommendation, then the under bust area is more loose.
The algorithm is rescaling the color map of the garment at the bust area to achieve the proper results.
5. Pleats Choice
This algorithm is choosing the proper pleats for the garment out of a large data set of pleats images.
The algorithm may use the following data:
The product size recommendation.
The choice of garment size.
The image of the garment.
The size chart of the garment.
Description of the Algorithm Operation:
The algorithm is choosing the proper pleats for the garment based on the following considerations:
The number of vertical pleats is growing as the size of the garment is getting larger, given that it is larger than the recommended size of the product. For garments of size that is smaller than the recommended size of the product, there are almost no vertical pleats.
The vertical pleats are becoming wider as the garment's size is getting larger, given that it is larger than the recommended size of the product.
The number of horizontal pleats is growing as the garment's size is getting smaller, given that it is smaller than the recommended size of the user. Almost no horizontal pleats exist on a garment that is larger than the recommended size.
6. Pleats Rescaling
This algorithm is rescaling the chosen pleats according to the vertical and horizontal rescaling of the garment.
The algorithm may use the following data:
The pleats image that was chosen by the "pleats choice" algorithm.
The pleats control points.
The vertical and horizontal rescaling information.
Description of the Algorithm Operation:
The algorithm is rescaling the pleats in the same way that it rescaled the garment.
7. Pleats Integration on the Garment
This algorithm is integrating the pleats on the garment. The algorithm gets as an input the image of the garment and the image of the pleats, both after the processing of the previous algorithms. The algorithm adds the pleats to the garment.

Figure 37:
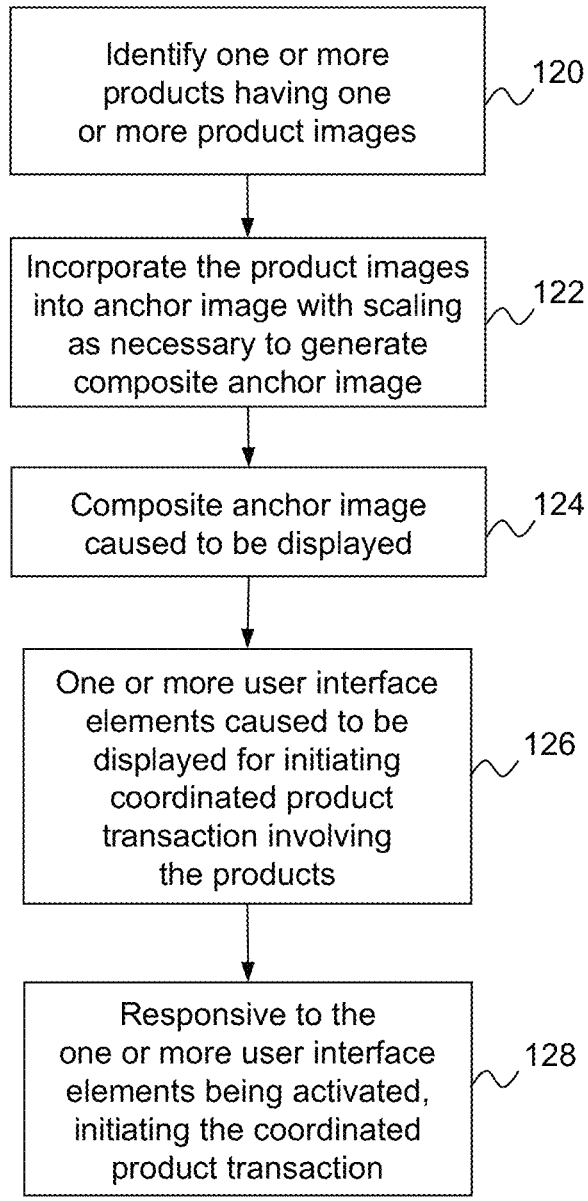
FIG. 37 is a flow diagram showing example operations that may be performed in accordance with the present disclosure.
Figure 38:
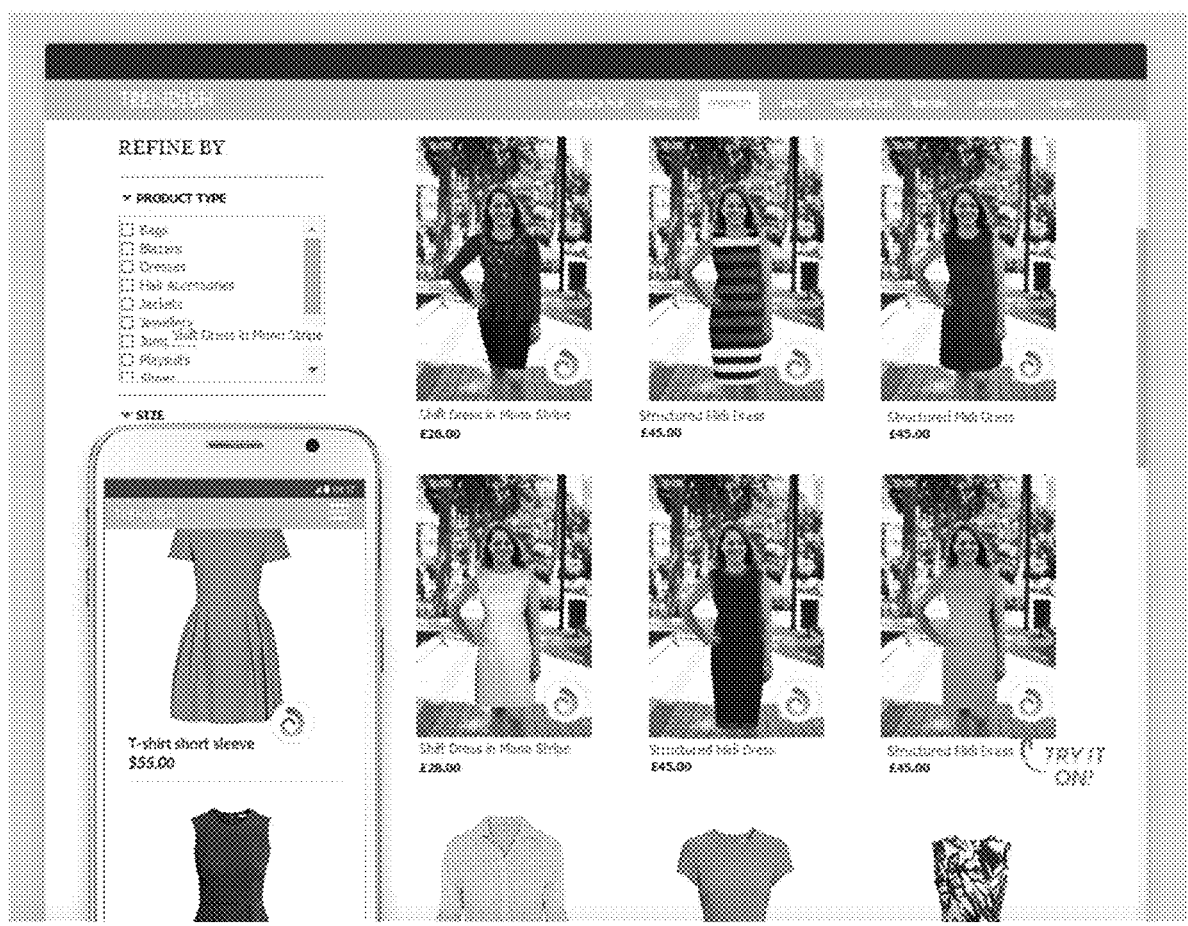
FIG. 38 is screenshot showing an example source of products, product images and product identification information.

FIG. 37 illustrates example method operations that may be performed according to one or more embodiments to combine user selectable product images and facilitate visualization-assisted coordinated product transactions. In block 120, one or more products having one or more associated product images are identified. As previously noted, there are various ways that the one or more products may be identified. For example, as shown in FIG. 1, product information available on product web pages 18 may be discovered by the Web Crawler module 12. As shown in FIG. 6, the product information may be stored in the product database 108. Product identifications may also be provided by a user (e.g., via the user's mobile device, computer or other data processing agent). The user may select the item from any suitable source. This may include, but is not limited to selecting from a webpage 18 or other online catalog, or scanning a barcode or a QR code or a price-tag or a clothes-tag of an actual product in a store (as shown by reference numeral 20 in FIG. 1), or capturing an image of the product (e.g., from the actual product or from images thereof in print media such as a newspaper or magazine), or entering or dictating or saying the name of a product or vendor, for example, "Old Navy, skirt, model Barbara," which the may be looked-up online or at a vendor's website in order to extract therefrom the items' data and image. Additional product sources include "inspirational" sources, such as images depicting celebrities wearing identifiable clothing items that are available for purchase from one or more vendors. FIG. 38 illustrates one example source representing a clothing product vendor's webpage, which may be viewed using a web browser or web application on a computer or, as shown in the inset, on a mobile device. It will be seen that the product images may include the previously discussed "Try It On" user interface element that activates the processing of FIG. 37 and virtually dresses the product on an image of a user.

In block 122 of FIG. 37, the one or more product images are image processed by incorporating the image(s) into an anchor image to generate a composite digital anchor image that depicts one or more products according to an intended manner of use thereof. This image processing may include using product dimension information to scale the one or more product images to match a scale of the anchor image.

Figure 39:
FIG. 39 is a series of composite anchor images showing an anthropomorphic entity virtually dressed in various clothing products.

In block 124 of FIG. 37, the composite anchor image is caused to be displayed. For example, the composite anchor image could be displayed on a user's mobile device or computer. It could also be displayed on an e-commerce webpage, such as the one illustrated in FIG. 38 (e.g., in response to a user activating the "Try It On" button). FIG. 39 depicts a composite anchor image in various states of virtual dressing in which a user tries on different clothing products. The composite anchor image of FIG. 39 depicts an anthropomorphic entity, namely a user image, and a background image that may have been a background of the original user image or could have been part of the initial anchor image from which the composite anchor image is generated. It will be seen that the product images are located in proper spatial relationship with the user, and are in the same scale as the user.

In block 126 of FIG. 37, one or more user interface elements are caused to be displayed in association with the composite anchor image, the one or more user interface being operable to initiate a coordinated product transaction involving the one or more products. FIGS. 40A-E are illustrative. They depict an example user device, namely a smartphone, that displays a series of anchor images (both initial and composite). It will appreciated that the user device of FIGS. 40A-E may not only implement block 126 to display the anchor images, but it may also have performed one or more of the operations of blocks 120, 122 and 124 of FIG. 37. In that case, the user device may be configured to implement the system 2 of FIG. 1. Alternatively, the operations blocks 120, 122 and 124 may be performed by a server-side implementation of the system 2, with the user device operating as a client of the server system 2. The functions of the user device may then be limited to providing an initial user image to the server system 2 and/or thereafter displaying the anchor images received from the server system, as contemplated by FIG. 6.

Figure 40E:
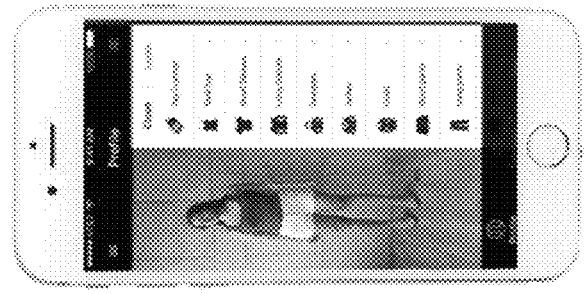
FIGS. 40A-40E are screenshots showing anchor images (initial and composite) prior to and during virtual dressing of an anthropomorphic entity, and further showing user interface elements for initiating a product sales transaction.
Figure 40D:
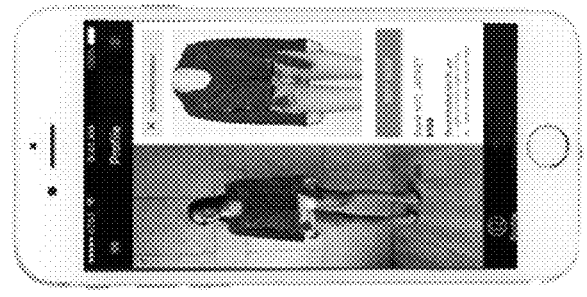
Figure 40C:
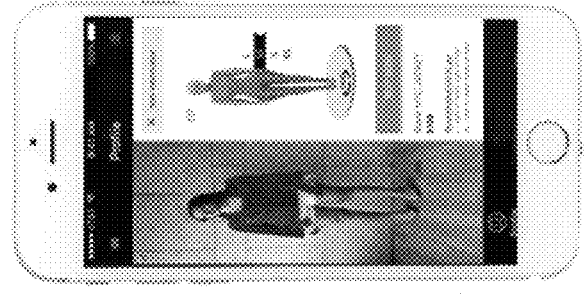
Figure 40B:
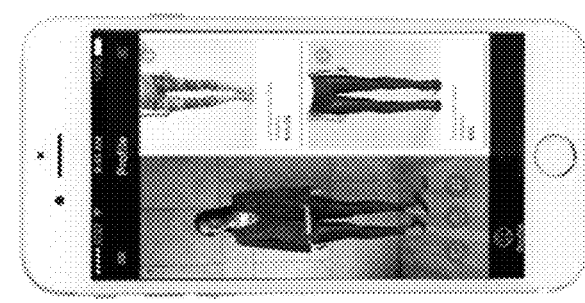
Figure 40A:
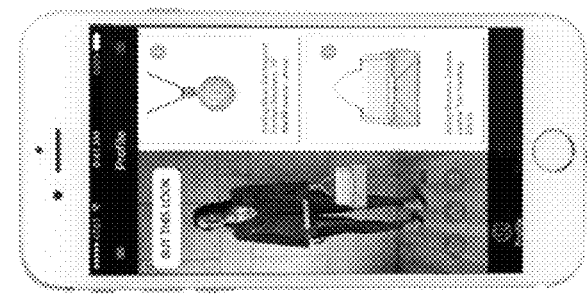

FIG. 40A depicts an initial anchor image (on the left side of the display) prior to virtual dressing. The initial anchor image of FIG. 40A includes an anthropomorphic entity, namely, a user image. The user is shown to be wearing the user's own clothing. The right side of the display in FIG. 40A contains product search tools for searching and obtaining images of different types of (clothing) products from various sources (including but not limited to e-commerce sites, clothing tags, etc.). FIG. 40B depicts a first composite anchor image (on the left side of the display) following virtual dressing of the same user in a jacket. A user interface element that allows the user to purchase the product is shown to the right of the first composite anchor image. This portion of the display also depicts vendor information about the product obtained from the vendor's website. FIG. 40C depicts the same composite anchor image and user interface element shown in FIG. 40B, but with sizing information being displayed to aid the user in selecting the correct size of the item to be purchased. FIG. 40D depicts a second composite anchor image (on the left side of the display) with the same user shown in FIGS. 40A-40C, but dressed in not only the jacket of FIGS. 40B-40C but also a pair of pants. To the right of the second composite anchor image is vendor information about the pants that were selected, as well as information about an alternative pair of pants from the same vendor. FIG. 40E depicts a third composite anchor image (on the left side of the display) with the same user shown in FIGS. 40A-40D, but dressed in not only the jacket of FIGS. 40B-40C, the pants of FIG. 40D, but also a purse. To the right of the third composite anchor image is vendor information about the purse that was selected, as well as information about a locket from the same vendor. FIG. 40E additionally shows a single-click user interface element called "Buy This Look," that may be used to initiate a coordinated transaction for purchasing all of the virtual dressing items shown in the third composite anchor image, namely, the jacket, the pants, and the purse.

Figure 41D:
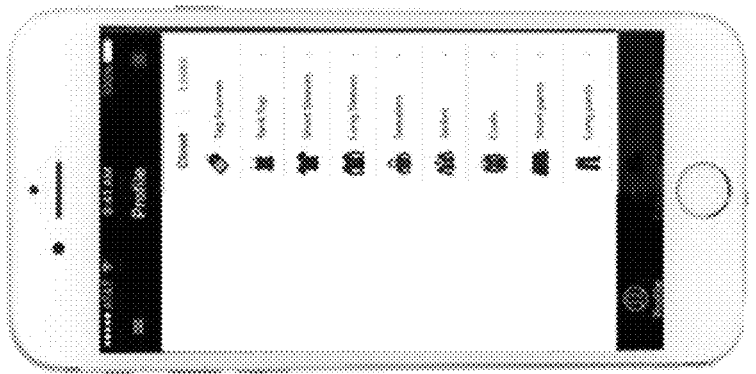
FIGS. 41A-41D are screenshots showing anchor images (initial and composite) prior to and during virtual dressing without an anthropomorphic entity, and further showing user interface elements for initiating a product sales transaction.
Figure 41C:
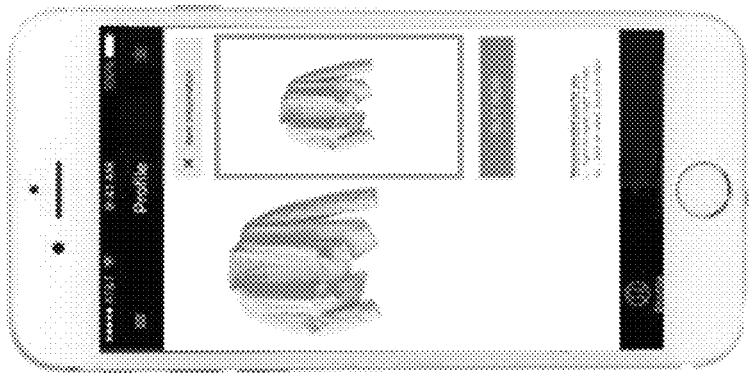
Figure 41B:
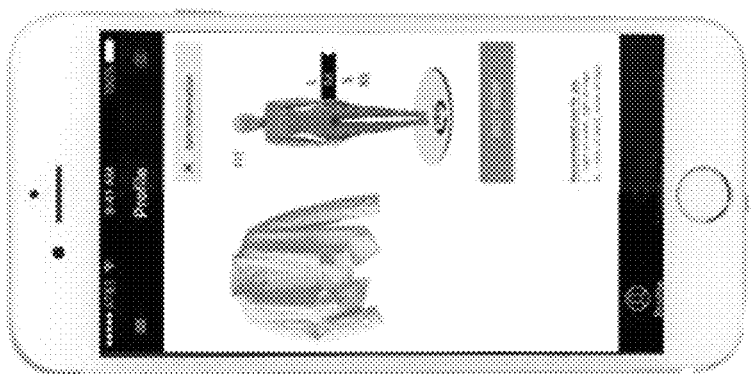
Figure 41A:
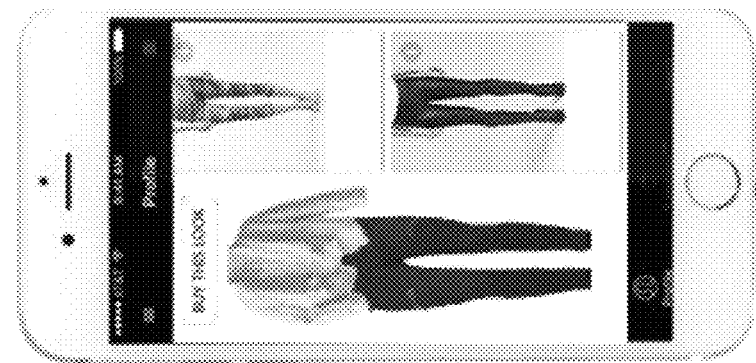

FIGS. 41A-D illustrate another example in which a user device, such as a smartphone, displays anchor images (both initial and composite). In this example, FIG. 1 depicts an initial anchor image (on the left side of the display) that contains no anthropomorphic entity or background image. The initial anchor image is blank. The right side of the display in FIG. 41A contains product search tools for searching and obtaining images of different types of (clothing) products from various sources (including but not limited to e-commerce sites, clothing tags, etc.). FIG. 41B depicts a first composite anchor image (on the left side of the display) that incorporates a shirt. A user interface element that allows the user to purchase the product is shown to the right of the first composite anchor image. This portion of the display also depicts vendor information about the product obtained from the vendor's website. FIG. 41C depicts the same composite anchor image and user interface element shown in FIG. 41B, but with sizing information being displayed to aid the user in selecting the correct size of the item to be purchased. FIG. 41D depicts a second composite anchor image (on the left side of the display) that includes not only the shirt of FIGS. 41B-41C, but also a pair of pants. Note that the shirt and pants are spatially arranged in the composite anchor image according to the intended manner of use, namely, with the shirt above the pants, and with the shirt being lying over the pants at locations where they overlap. To the right of the second composite anchor image is vendor information about the pants that were selected. FIG. 41D additionally shows a single-click user interface element called "Buy This Look," that may be used to initiate a transaction for purchasing all of the virtual dressing items shown in the second composite anchor image, namely, the jacket and the pants.

In block 128 of FIG. 37, in response to the one or more user interface elements being activated, a coordinated product transaction involving the products is initiated. As previously noted, the transaction may be a purchase transaction whereby the user may proceed to place a purchase order for two (or more) items, via a single click mechanism, or via a single checkout mechanism that includes one or more input operations, and a universal digital wallet or payment mechanism may be used in order to enable the user to perform a single checkout process with regard to multiple items that were collected from multiple different vendors. As also previously noted, the transaction may be a redirect transaction that redirects a user to one or more vendor websites (or other e-commerce sites) where the products may be purchased using vendor-specific purchase mechanisms.

Figure 42:
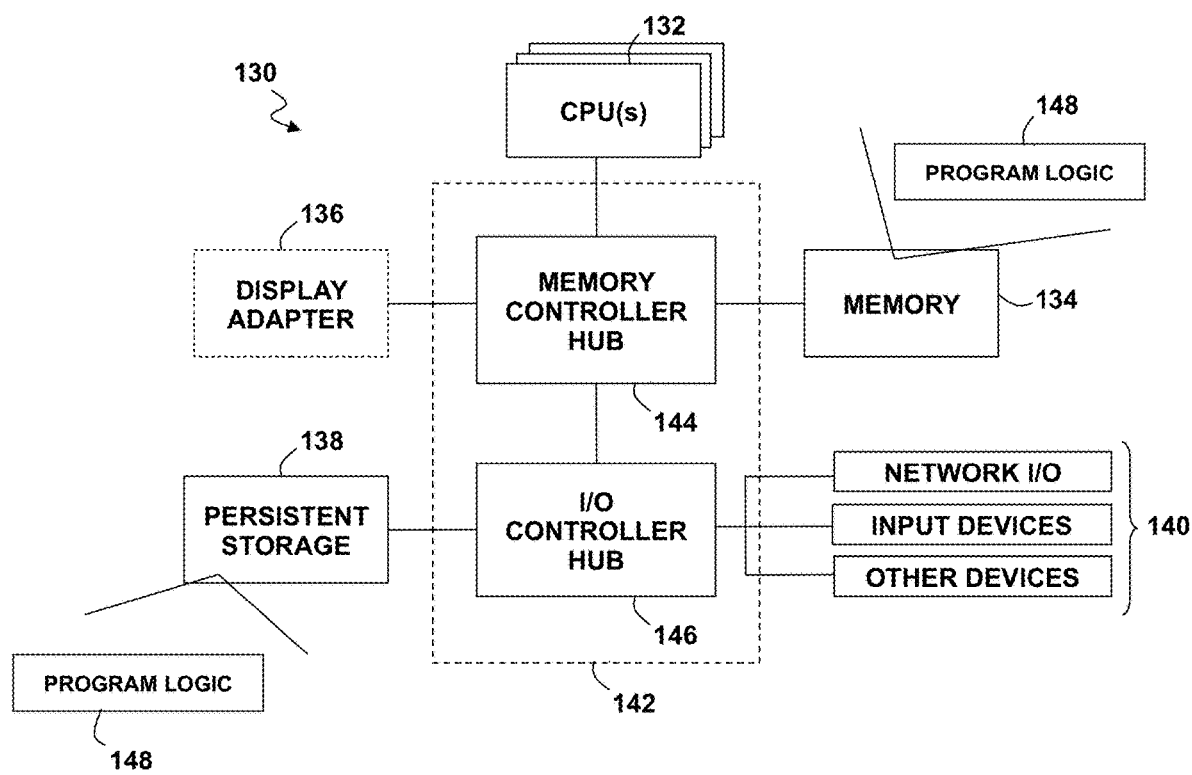
FIG. 42 is block diagram showing example components that may be used in systems and devices that perform operations in accordance with the present disclosure.

FIG. 42 illustrates example hardware components 130 that may be used to implement the system 2 of FIG. 1 and/or the system 102 of FIG. 6 and/or a system or device that runs a client application 110 as shown in FIG. 6. The hardware components of FIG. 41 are illustrated as including one or more CPUs or other logic-implementing hardware 132 that may operate in conjunction with a memory 134 (e.g., RAM, ROM, or a combination thereof) to provide a data processing core. In some embodiments, a display adapter 136 may be provided for generating visual output information (e.g., text and/or graphics) to an associated display (not shown in FIG. 41). Additional components shown in FIG. 41 may include a persistent data storage resource 138 (e.g., a disk drive, a solid state drive, flash storage, etc.) and various peripheral devices 140. The peripheral devices 140 may include conventional I/O resources, such as a network I/O device (Ethernet, WiFi, Cellular, etc.). In some embodiments, the peripheral devices 130 may further include an input device such as a touch screen, a keyboard (real or virtual), and possibly a pointing device (in client transaction agents that support such functionality). Other types of peripheral devices 140 may also be provided, as needed. A bus infrastructure 142, which may include a memory controller hub or chip 144 (e.g., a northbridge) and an I/O (input/output) controller hub or chip 146 (e.g., a southbridge), may be used to interconnect the foregoing components. It should be understood that the above-described hardware components are set forth as examples only, and that other suitable hardware components and component arrangements may also be used.

FIG. 42 additionally shows program logic 148 that may be permanently stored in the persistent data storage resource 138 (or elsewhere) and loaded in the memory 134 during program execution. The program logic 148 may embody one or more of the modules, processes and algorithms previously described in connection with the system 2 of FIG. 1, and/or the system 102 of FIG. 6, and/or the system or device that runs a client application 110 as shown in FIG. 6.

Embodiments of the disclosed subject matter may be utilized in, or with, or in conjunction with, a variety of devices or systems; for example, a smartphone, a tablet, a smart-watch, a "magic mirror" device intended for utilization at real-life stores, a laptop computer, a desktop computer, a device having an imager or camera, a vehicular device or unit, a gaming device, a gaming console, a wearable device, a Virtual Reality (VR) device or helmet or glasses or headgear, an Augmented Reality (AR) device or helmet or glasses or headgear, an Internet of Things (IoT) device or appliance, an Internet-connected device or appliance, a wireless-connected device or appliance, and/or other suitable systems and devices.

Example systems of the present invention may optionally comprise, or may be implemented by utilizing suitable hardware components and/or software components. For example, processors, processor cores, Central Processing Units (CPUs), Digital Signal Processors (DSPs), circuits, Integrated Circuits (ICs), controllers, memory units, registers, accumulators, storage units, input units (e.g., touch-screen, keyboard, keypad, stylus, mouse, touchpad, joystick, trackball, microphones), output units (e.g., screen, touch-screen, monitor, display unit, audio speakers), acoustic sensor(s), optical sensor(s), wired or wireless modems or transceivers or transmitters or receivers, GPS receiver or GPS element or other location-based or location-determining unit or system, network elements (e.g., routers, switches, hubs, antennas), and/or other suitable components and/or modules. The system(s) of the present invention may optionally be implemented by utilizing co-located components, remote components or modules, "cloud computing" servers or devices or storage, client/server architecture, peer-to-peer architecture, distributed architecture, and/or other suitable architectures or system topologies or network topologies.

In accordance with embodiments of the disclosed subject matter, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Although portions of the discussion herein relate, for demonstrative purposes, to wired links and/or wired communications, some embodiments are not limited in this regard, but rather, may utilize wired communication and/or wireless communication, may include one or more wired and/or wireless links, may utilize one or more components of wired communication and/or wireless communication, and/or may utilize one or more methods or protocols or standards of wireless communication.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented a computer program product that includes machine-readable program or code or instructions, such as computer program, code or instructions, which may be stored on a non-transitory data storage medium or non-transitory data storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C #, Java, JavaScript, SQL, Ruby on Rails, Go, Cobol, Fortran, ActionScript, AJAX, XML, JSON, Lisp, Eiffel, Verilog, Hardware Description Language (HDL, BASIC, Visual BASIC, Matlab, Pascal, HTML, HTML5, CSS, Perl, Python, PHP, machine language, machine code, assembly language, or the like.

Some embodiments may comprise, or may be implemented as, a Software Development Kit (SDK) or an Application Programming Interface (API), that may allow third-party developers or vendors to interface with the system, or to implement their own version (e.g., branded, white label, or the like) of the system, in an efficient manner.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA or handheld device which incorporates wireless communication capabilities, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may comprise, or may be implemented by using, an "app" or application which may be downloaded or obtained from an "app store" or "applications store", for free or for a fee, or which may be pre-installed on a computing device or electronic device, or which may be otherwise transported to and/or installed on such computing device or electronic device.

Functions, operations, components and/or features described herein with reference to one or more embodiments of the present invention, may be combined with, or may be utilized in combination with, one or more other functions, operations, components and/or features described herein with reference to one or more other embodiments of the present invention. The disclosed subject matter may thus comprise any possible or suitable combinations, re-arrangements, assembly, re-assembly, or other utilization of some or all of the modules or functions or components that are described herein, even if they are discussed in different locations or different chapters of the above discussion, or even if they are shown across different drawings or multiple drawings.

Discussions herein utilizing terms such as, for example, "processing", "computing", "calculating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic.

Furthermore, repeated use of the phrase "in one embodiment" does not necessarily refer to the same embodiment, although it may. Similarly, repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to, and does not intend to imply as if the items or objects so described must be in a particular given sequence, either temporally, spatially, in ranking, or in any other ordering manner.

While certain features of some demonstrative embodiments of the disclosed subject matter have been illustrated and described herein, various modifications, substitutions, changes, and equivalents may occur to those skilled in the art. Accordingly, the appended claims are intended to cover all such modifications, substitutions, changes, and equivalents.

What is claimed is:

1. A method, comprising:
receiving a first image depicting first subject matter in digital form;
receiving a second image depicting second subject matter in digital form;
performing one or more image processing operations on said second image, said one or more image processing operations being selected from the group consisting of:
 (1) shape-estimation and shape in-painting, said shape-estimation comprising interpolating shape for hidden areas of said second subject matter that are not visible in said second image, and said shape in-painting comprising filling in said hidden areas of said second subject matter in said second image that were interpolated by said shape-estimation;
 (2) perspective and shape correction, said perspective and shape correction comprising one or both of (a) adding, reducing, creating or modifying wrinkle effects in said second image, or (b) adding 3D effects in said second image by modifying an angular perspective and shape to change non-curved contour lines to curved contour lines in said second image;
 (3) features and classification processing, said features and classification processing comprising extracting second subject matter characteristics and points-of-interest from said second image and classifying said second subject matter based on said characteristics and points-of-interest;
 (4) second subject matter extraction, said second subject matter extraction comprising generating a second subject matter mask in which one or more portions of said second image is removed, added, completed or modified;
 (5) adding gravity effects, said adding gravity effects comprising simulating an effect of gravity on one or more portions of said second subject matter by modifying said second image so that said one or more portions of said second subject matter appear to be dropping down due to gravity; and
 (6) unifying a blur level, lighting level and noise level of said first image and said second image;
generating a composite image that depicts said second subject matter overlayed onto said first subject matter; and
causing said composite image to be displayed as a virtual presentation.

2. The method of claim 1, wherein said one or more image processing operations include said shape-estimation and shape in-painting.

3. The method of claim 1, wherein said one or more image processing operations include said perspective and shape correction that includes said adding, reducing, creating or modifying wrinkle effects in said second image.

4. The method of claim 1, wherein said one or more image processing operations include said perspective and shape correction that includes said adding 3D effects in said second image by modifying an angular perspective and shape to change non-curved contour lines to curved contour lines in said second image.

5. The method of claim 1, wherein said one or more image processing operations include said features and classification processing.

6. The method of claim 1, wherein said one or more image processing operations include said second subject matter extraction.

7. The method of claim 1, wherein said one or more image processing operations include said adding gravity effects.

8. The method of claim 1, wherein said one or more image processing operations include said unifying a blur level, lighting level and noise level of said first image and said second image.

9. A system, comprising:
one or more processors operably coupled to one or more memory devices;
program instructions stored in said memory and executable by said one or more processors to perform operations, said operations comprising:
receiving a first image first subject matter in digital form;
receiving a second image depicting second subject matter in digital form;
performing one or more image processing operations on said second image, said one or more image processing operations being selected from the group consisting of:
(1) shape-estimation and shape in-painting, said shape-estimation comprising interpolating shape for hidden areas of said second subject matter that are not visible in said second image, and said shape in-painting comprising filling in said hidden areas of said second subject matter in said second image that were interpolated by said shape-estimation;
(2) perspective and shape correction, said perspective and shape correction comprising one or both of (a) adding, reducing, creating or modifying wrinkle effects in said second image, or (b) adding 3D effects in said second image by modifying an angular perspective and shape to change non-curved contour lines to curved contour lines in said second image;
(3) features and classification processing, said features and classification processing comprising extracting second subject matter characteristics and points-of-interest from said second image and classifying said second subject matter based on said second subject matter characteristics and points-of-interest;
(4) second subject matter extraction, said second subject matter extraction comprising generating a second subject matter mask in which one or more portions of said second image are removed, added, completed or modified;
(5) adding gravity effects, said adding gravity effects comprising simulating an effect of gravity on one or more portions of said second subject matter by modifying said second image so that said one or more portions of said second subject matter appear to be dropping down due to gravity; and
(6) unifying a blur level, lighting level and noise level of said first image and said second image;
generating a composite image that depicts said second subject matter overlayed onto said first subject matter; and
causing said composite anchor image to be displayed as a virtual presentation.

10. The system of claim 9, wherein said one or more image processing operations include said shape-estimation and shape in-painting.

11. The system of claim 9, wherein said one or more image processing operations include said perspective and shape correction that includes said adding, reducing, creating or modifying wrinkle effects in said second image.

12. The system of claim 9, wherein said one or more image processing operations include said perspective and shape correction that includes said adding 3D effects in said second image by modifying an angular perspective and shape to change non-curved contour lines to curved contour lines in said second image.

13. The system of claim 9, wherein said one or more image processing operations include said features and classification processing.

14. The system of claim 9, wherein said one or more image processing operations include said second subject matter extraction.

15. The system of claim 9, wherein said one or more image processing operations include said adding gravity effects.

16. The system of claim 9, wherein said one or more image processing operations include said unifying a blur level, lighting level and noise level of said first image and second image.

17. A computer program product, comprising:
one or more non-transitory data storage media;
program instructions stored on said data storage media and executable by one or more processors to perform operations, said operations comprising:
receiving a first image depicting first subject matter in digital form;
receiving a second image depicting second subject matter in digital form;
performing one or more image processing operations on said second image, said one or more image processing operations being selected from the group consisting of:
(1) shape-estimation and shape in-painting, said shape-estimation comprising interpolating shape for hidden areas of said second subject matter that are not visible in said second image, and said shape in-painting comprising filling in said hidden areas of said second subject matter in said second image that were interpolated by said shape-estimation;
(2) perspective and shape correction, said perspective and shape correction comprising one or both of (a) adding, reducing, creating or modifying wrinkle effects in said second image, or (b) adding 3D effects in said second image by modifying an angular perspective and shape to change non-curved contour lines to curved contour lines in said second image;
(3) features and classification processing, said features and classification processing comprising extracting second subject matter characteristics and points-of-interest from said second image and classifying said second subject matter based on said second subject matter characteristics and points-of-interest;
(4) second subject matter extraction, said second subject matter extraction comprising generating a second subject matter mask in which one or more portions of said second image are removed, added, completed or modified;
(5) adding gravity effects, said adding gravity effects comprising simulating an effect of gravity on one or more portions of said second subject matter by modifying said second image so that said one or more portions of said second subject matter appear to be dropping down due to gravity; and (6) unifying a blur level, lighting level and noise level of said first image and said second image;

generating a composite image that depicts said second subject matter overlayed onto said first subject matter; and causing said composite image to be displayed as a virtual presentation.

18. The computer program product of claim 17, wherein said one or more image processing operations include said shape-estimation and shape in-painting.

19. The computer program product of claim 17, wherein said one or more image processing operations include said perspective and shape correction that includes said adding, reducing, creating or modifying wrinkle effects in said second image.

20. The computer program product of claim 17, wherein said one or more image processing operations include said perspective and shape correction that includes said adding 3D effects in said second image by modifying an angular perspective and shape to change non-curved contour lines to curved contour lines in said second image.

21. The computer program product of claim 17, wherein said one or more image processing operations include said features and classification processing.

22. The computer program product of claim 17, wherein said one or more image processing operations include said second subject matter extraction.

23. The computer program product of claim 17, wherein said one or more image processing operations include said adding gravity effects.

24. The computer program product of claim 17, wherein said one or more image processing operations include said unifying a blur level, lighting level and noise level of said first image and said second image.

* * * * *